US012764114B2

(12) United States Patent
Hwang

(10) Patent No.: US 12,764,114 B2
(45) Date of Patent: Oct. 13, 2026

(54) ARTIFICIAL INTELLIGENCE AGENT SYSTEM FOR MOBILE OPERATING SYSTEM AND OPERATING METHOD OF THE ARTIFICIAL INTELLIGENCE AGENT SYSTEM

(71) Applicant: Piamond Corp., Busan (KR)

(72) Inventor: Doo Geon Hwang, Busan (KR)

(73) Assignee: Piamond Corp., Busan (KR)

( * ) Notice: Subject to any disclaimer, the term of this patent is extended or adjusted under 35 U.S.C. 154(b) by 0 days.

(21) Appl. No.: 19/346,996

(22) Filed: Oct. 1, 2025

(65) Prior Publication Data

US 2026/0149714 A1 May 28, 2026

(30) Foreign Application Priority Data

Nov. 22, 2024 (KR) ........................ 10-2024-0168226
Apr. 15, 2025 (KR) ........................ 10-2025-0049039

(51) Int. Cl.
*H04L 9/40* (2022.01)
*G06F 16/27* (2019.01)

(52) U.S. Cl.
CPC .............. *H04L 63/10* (2013.01); *G06F 16/27* (2019.01); *H04L 63/083* (2013.01)

(58) Field of Classification Search
CPC ........ H04L 63/10; H04L 63/083; G06F 16/27
USPC ............................................................. 726/1
See application file for complete search history.

(56) References Cited

U.S. PATENT DOCUMENTS 9,317,686 B1 * 4/2016 Ye ......................... G06F 21/568
9,369,467 B1 * 6/2016 Rohee ................. H04W 12/084
2023/0065120 A1 * 3/2023 Hanby, IV ....... G06Q 10/06311
2023/0401326 A1 * 12/2023 Carru .................... G06F 16/252
2025/0286954 A1 * 9/2025 Goyal ............... H04M 3/53333

FOREIGN PATENT DOCUMENTS

KR 10-2025-0017074 A 2/2025

* cited by examiner

*Primary Examiner* — Moeen Khan
(74) *Attorney, Agent, or Firm* — Lee & Hayes, P.C.

(57) ABSTRACT

An AI (Artificial Intelligence) agent system for a mobile operating system and an operating method of the AI agent system are disclosed. An artificial intelligence agent system according to an embodiment may include an agent communication layer for receiving a processing request for an identified task from an application that receives a user request and identifies a task requiring agent operation, an agent runtime environment for verifying permission for the processing request via an agent security manager, processing the task by invoking at least one agent for the processing request for which the permission has been verified, and transmitting a result of the task processing to the application via the agent communication layer, and the agent security manager for managing permission of the task and permission of the at least one agent.

16 Claims, 26 Drawing Sheets

ARTIFICIAL INTELLIGENCE AGENT SYSTEM FOR MOBILE OPERATING SYSTEM AND OPERATING METHOD OF THE ARTIFICIAL INTELLIGENCE AGENT SYSTEM

CROSS REFERENCE TO RELATED PATENT APPLICATION

This application claims the benefit of priority under 35 U.S.C. § 119 to Korean Patent Application No. 10-2024-0168226 filed on Nov. 22, 2024, and Korean Patent Application No. 10-2025-0049039 filed on Apr. 15, 2025, in the Korean Intellectual Property Office (KIPO), the entire contents of which are incorporated herein by reference.

BACKGROUND

1. Field

The following embodiments relate to an AI (Artificial Intelligence) agent system for a mobile operating system and an operating method of the AI agent system.

2. Description of Related Art

Various limitations exist within current mobile platforms. First, there are constraints in inter-app integration. Data sharing between applications is only possible through limited API (Application Programming Interface), making real-time data exchange difficult and ultimately degrading user experience. In addition, when performing inter-app integration tasks, users are required to repeatedly grant permission, which causes inconvenience.

Centralized permission management also presents challenges. At present, permission management is performed only at the application level, making fine-grained control difficult, and there are limitations in continuously monitoring permission once granted. Furthermore, the architecture makes it difficult to modify or revoke permission in real time.

Therea are also constraints in sharing application execution contexts. Because each application has an independent runtime environment, there is a problem of resource redundant use, and user context information cannot be shared across applications. As a result, continuity of task history cannot be ensured, leading to a degraded user experience.

To address these challenges, integration of Agent Kit is required. With the increasing demand for AI (Artificial Intelligence) based personalized services, there is a need for seamless inter-app task processing, along with functionality to proactively provide services by recognizing situations in real time. Furthermore, with the introduction of AI agents, systematic management of application access permission has become important, and there is a growing demand for data privacy protection. Therefore, a system for real-time permission control and monitoring should be established.

Optimization of system resources is also an important challenge. In multi-application runtime environments, system resources must be utilized efficiently, and redundant computations should be eliminated by sharing common contexts. For this, integrated resource management at platform level should be implemented.

PRIOR ART DOCUMENTS

Korean Patent Publication No. 10-2025-0017074

SUMMARY

Embodiments provide an AI (Artificial Intelligence) agent system for a mobile operating system and an operating method of the AI agent system.

An operating method of an artificial intelligence agent system is provided, the artificial intelligence agent system comprising an agent runtime environment, an agent communication layer, and an agent security manager, and the operating method comprising receiving a processing request for an identified task from an application that receives a user request and identifies a task requiring agent operation, at the agent communication layer; verifying permission for the processing request via the agent security manager, at the agent runtime environment; processing the task by invoking at least one agent based on a mobile operating system for the processing request for which the permission has been verified, at the agent runtime environment; and transmitting a result of the task processing to the application via the agent communication layer, at the agent runtime environment.

According to an aspect, the receiving a processing request may be configured to receive the processing request from the application via an agent development tool, and the agent development tool may be configured to normalize the processing request received from the application into a standardized format, attach a security token and authentication information required for the processing request to the processing request, and collect context information required for execution of the task and add it to the processing request.

According to another aspect, the receiving a processing request may comprise managing routing of the processing request; converting data included in the processing request; managing data synchronization among the at least one agent; and managing priorities of tasks awaiting processing.

According to another aspect, the managing routing of the processing request may be configured to analyze destination of the processing request, check system load status to determine an optimal processing path, determine whether to process the processing request immediately or place it in a queue based on priority, and monitor the processing status of the task to manage timeout of the task.

According to another aspect, the converting data included in the processing request may be configured to verify or convert the format of the data included in the processing request, process chunk-based segmentation of the data according to the data size, apply compression and encryption to the data based on the data importance, and verify integrity of the converted data.

According to another aspect, the managing data synchronization may be configured to manage data synchronization status among a plurality of agents processing the same task, detect and resolve data version conflicts, identify data requiring real-time synchronization and prioritize its processing, and execute multiple procedures in the event of synchronization failure.

According to another aspect, the managing priorities may be configured to adjust processing speed of the task according to system load, perform timeout processing of the task based on waiting time, monitor queue status, and manage overload conditions.

According to another aspect, the processing the task may comprise managing agent process for the at least one agent; monitoring resources for the agent process; managing context of the at least one agent; and managing a cache handler for data related to the task processing of the at least one agent.

According to another aspect, the managing an agent process may be configured to manage creation and termination of the agent process, set and manage resource allocation for each agent process, coordinate and manage communication between agent processes, and detect and clean up abnormal agent processes.

According to another aspect, the monitoring resources may be configured to monitor in real time resource usage of CPU (Central Processing Unit), memory, and storage of the agent process, predict and alert resource shortage conditions based on the monitored resource usage, analyze resource usage efficiency and generate and provide optimization strategies, and generate a report on the current status of resource usage.

According to another aspect, the managing context may be configured to collect execution context information for each of the at least one agent, track and record changes in the context, synchronize context information among agents processing the same task, and create and manage restoration points of the context.

According to another aspect, the managing a cache handler may be configured to store the data in cache based on frequency of data usage, periodically verify validity of the data stored in the cache, and monitor cache hit rate to optimize the cache hit rate.

According to another aspect, the agent security manager may be configured to manage permission of the task and permission of the at least one agent, track and record changes in permission, block and report unauthorized access attempts, monitor in real time security status of the artificial intelligence agent system, detect and analyze abnormal behaviors and patterns, assess and respond to security threat levels, generate and manage security event logs, manage policy rules by using a policy rule engine, detect and resolve conflicts of the policy rules, monitor the results of policy rule application, manage and deploy updates of the policy rules, record security-related activities, generate detailed logs for major security events, analyze log data to derive security insights, and generate reports that meet audit requirements.

A computer program stored on a computer-readable recording medium for executing the method on a computer device in conjunction with the computer device is provided.

A computer-readable recording medium having recorded thereon a computer program for executing the method on a computer device is provided.

An artificial intelligence agent system is provided, the system comprising an agent communication layer for receiving a processing request for an identified task from an application that receives a user request and identifies a task requiring agent operation; an agent runtime environment for verifying permission for the processing request via an agent security manager, processing the task by invoking at least one agent based on a mobile operating system for the processing request for which the permission has been verified, and transmitting a result of the task processing to the application via the agent communication layer, and the agent security manager for managing permission of the task and permission of the at least one agent.

An AI (Artificial Intelligence) agent system for a mobile operating system and an operating method of the AI agent system may be provided.

DETAILED DESCRIPTION

Hereinafter, embodiments of the present invention will be described in detail with reference to the accompanying drawings.

An AI (Artificial Intelligence) agent system according to embodiments of the present invention may be implemented by at least one computer device. In this case, a computer program according to an embodiment of the present invention may be installed and executed on the at least one computer device implementing the AI agent system, and the at least one computer device may perform an operating method of the AI agent system according to embodiments of the present invention under the control of the executed computer program. The aforementioned computer program may be stored on a computer-readable recording medium for executing the operating method of the AI agent system on a computer device in conjunction with the computer device.

Figure 1:
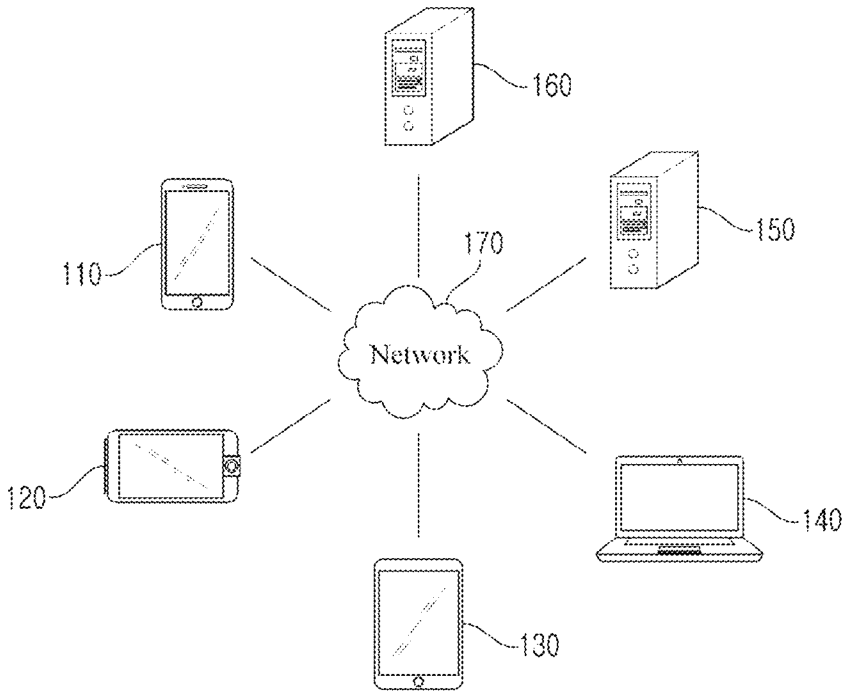
FIG. 1 is a drawing illustrating an example of a network environment according to an embodiment of the present invention.

FIG. 1 is a drawing illustrating an example of a network environment according to an embodiment of the present invention. The network environment of FIG. 1 indicates an example including a plurality of electronic devices 110, 120, 130, and 140, a plurality of servers 150 and 160, and a network 170. Such FIG. 1 is provided as an example only and the number of electronic devices or the servers is not limited as FIG. 1.

The plurality of electronic devices 110, 120, 130, and 140 may be stationary terminals or mobile terminals implemented with a computer system. As examples of the plurality of electronic devices 110, 120, 130, and 140, there are a smartphone, a mobile phone, a navigation device, a computer, a laptop computer, a terminal for digital broadcasting, PDA (Personal Digital Assistants), a PMP (Portable Multimedia Player), a tablet PC, a game console, a wearable device, an IoT (Internet of Things) device, a VR (Virtual Reality) device, an AR (Augmented Reality) device, etc. As an example, in FIG. 1, a shape of a smartphone is illustrated as an example of the electronic device 110, but in the embodiments of the present disclosure, the electronic device 110 may mean one of various physical computer systems capable of communicating with other electronic devices 120, 130, and 140 and/or the servers 150 and 160 through the network 170 by substantially using wireless or wired communication method.

A communication method is not limited, and may include short-distance wireless communication between devices in addition to communication methods using communication networks (e.g., a mobile communication network, wired Internet, wireless Internet, a broadcasting network, a satellite network, and the like) which may be included in the network 170. For example, the network 170 may include one or more any networks of a PAN (personal area network), a LAN (local area network), a CAN (campus area network), a MAN (metropolitan area network), a WAN (wide area network), a BBN (broadband network), and the Internet. Furthermore, the network 170 may include any one or more of network topologies, including a bus network, a star network, a ring network, a mesh network, a star-bus network, and a tree or hierarchical network, but is not limited thereto.

Each of the servers 150 and 160 may be implemented with a computer device or a plurality of computer devices for providing instructions, code, files, contents, or services by communicating with the plurality of electronic devices 110, 120, 130, and 140 through the network 170. For example, the server 150 may be a system that provides a first service to the plurality of electronic devices 110, 120, 130, and 140 connected through the network 170, and the server 160 also may be a system that provides a second service to the plurality of electronic devices 110, 120, 130, and 140 connected through the network 170. As more particular example, through an application as a computer program installed and operated on the plurality of electronic devices 110, 120, 130, and 140, the server 150 may provide a service targeted by the corresponding application (e.g., search service and the like) as the first service to the plurality of electronic devices 110, 120, 130, and 140. As another example, the server 160 may provide a service for distributing a file for installation and operation of the above-described application to the plurality of electronic devices 110, 120, 130, and 140 as the second service.

Figure 2:
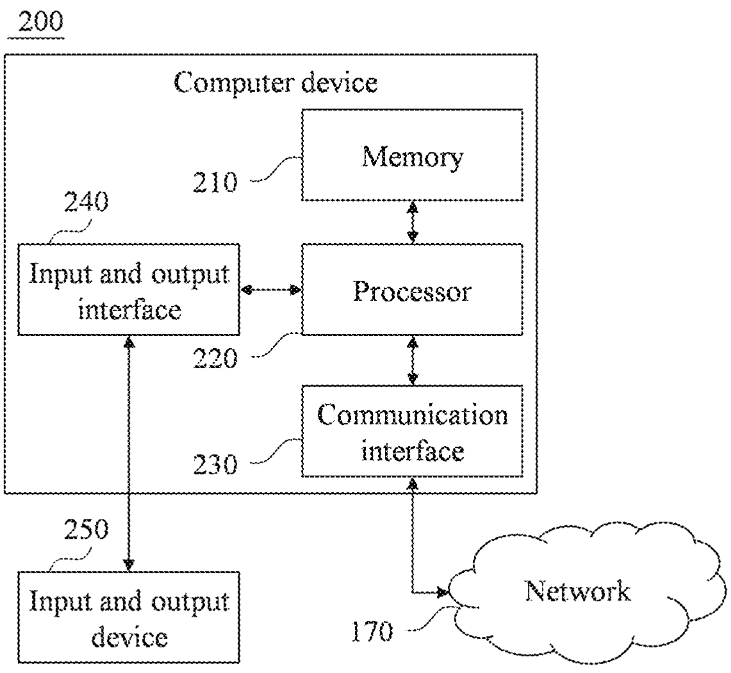
FIG. 2 is a block diagram illustrating an example of a computer device according to an embodiment of the present invention.

FIG. 2 is a block diagram illustrating an example of a computer device according to an embodiment. Each of the plurality of electronic devices 110, 120, 130, and 140 or each of the servers 150 and 160 described above may be implemented by a computer device 200 shown in FIG. 2.

As illustrated in FIG. 2, such computer device 200 may include a memory 210, a processor 220, a communication interface 230, and an input/output (I/O) interface 240. The memory 210 is a computer-readable recording medium, and may include permanent mass storage devices, such as a RAM (random access memory), a ROM (read only memory) and a disk drive. Here, the permanent mass storage device, such as a ROM and a disk drive, may be included in the computer device 200 as a permanent storage device separated from the memory 210. Furthermore, an operating system and at least one program code may be stored in the memory 210. Such software components may be loaded from a computer-readable recording medium separated from the memory 210 to the memory 210. Such separate computer-readable recording medium may include computer-readable recording media, such as a floppy drive, a disk, a tape, a DVD/CD-ROM drive, a memory card, and the like. In another embodiment, software components may be loaded onto the memory 210 through the communication interface 230, not a computer-readable recording medium. For example, the software components may be loaded onto the memory 210 of the computer device 200 based on a computer program installed by files received through the network 170.

The processor 220 may be configured to process instructions of a computer program by performing basic arithmetic, logic and I/O operations. The instructions may be provided to the processor 220 by the memory 210 or the communication interface 230. For example, the processor 220 may be configured to execute instructions received according to program code stored in a recording device, such as the memory 210.

The communication interface 230 may provide a function for enabling the computer device 200 to communicate with other devices (e.g. the above-described storing devices) through the network 170. For example, a request, an instruction, data or a file generated by the processor 220 of the computer device 200 according to program code stored in a recording device such as the memory 210 may be transmitted to other devices through the network 170 according to control of the communication interface 230. Inversely, a signal, an instruction, data or a file from another device may be received to the computer device 200 through the communication interface 230 of the computer device 200 passing through the network 170. A signal, an instruction or data and the like received through the communication interface 230 may be transmitted to the processor 220 or the memory 210, and a file may be stored in a storage medium (the above-described permanent storage device) which may be further included in the computer device 200.

The I/O interface 240 may be means for interface with an input/output (I/O) device 250. For example, the input device may include a device such as a microphone, a keyboard or a mouse and the like, and the output device may include a device such as a display or a speaker. For another example, the I/O interface 240 may be means for interface with a device in which functions for input and output have been integrated into one, such as a touch screen. The I/O device 250, together with the computer device 200, may be configured as a single device.

Furthermore, in other embodiments, the computer device 200 may include components less or more than the components of FIG. 2. However, it is not necessary to clearly illustrate most of conventional components. For example, the computer device 200 may be implemented to include at least some of the I/O device 250 above described or may further include other components such as a transceiver, a database, etc.

In the era of On-Device AI, the need for an Agent Kit is growing increasingly important.

As the artificial intelligence paradigm changes, it is shifting from cloud-based AI to device-centric AI. As the needs for privacy protection and real-time processing increase, the demand for reducing network dependency and utilizing AI in offline has grown. Moreover, the need for user-specific personalized AI services is expanding, services reflecting an individual's context in real time are required. In this process, privacy-preserving personalized AI processing has emerged as an important factor.

The core necessity of the Agent Kit can be summarized as integrated AI management frameworks, standardized interfaces, and real-time performance optimization. There is a need to efficiently manage diverse On-Device AI models and systematically operate the AI model lifecycle. It is also important to optimize device resources and utilize them. Establishing a consistent communication framework between applications and AI models is vital, along with increasing the reusability and scalability of AI functionalities. Through this, an environment should be established that enables developers to easily integrate AI. Additionally, key challenges include optimizing AI models to suit device performance, balancing battery efficiency with processing speed, and managing the concurrent execution of multiple AI models.

There are several problems occurring in the current market. As AI is implemented independently across individual applications, resource redundancy occurs, and it becomes difficult to provide consistent user experience. This results in increased development and maintenance costs. In addition, from a security and privacy perspective, vulnerabilities arise due to security application at the individual app level, and there is a lack of integrated data protection management. There are also limitations in performance optimization, as optimization at the individual app level leads to a decrease in overall system efficiency, causes performance degradation due to resource contention, and results in low power consumption efficiency.

The Agent Kit offers solutions to address these problems. It provides AI runtime environment at system-level, establishes a standardized AI model management framework, and enhances efficiency through centralized resource management. From a security perspective, it applies system-level security policies, constructs an integrated data protection framework, and offers a consistent privacy protection mechanism. Additionally, by enabling resource sharing among AI models, the overall system performance can be optimized, and intelligent task scheduling can further maximize efficiency.

This leads to increased development productivity. With a standardized AI integration environment, development time can be reduced, by utilizing reusable components, efficiency can be improved, and maintenance costs can be lowered. The user experience is also improved. A consistent quality of AI services is provided, device resources are used efficiently to enhance performance, and the delivery of personalized services becomes more feasible. Finally, system efficiency is enhanced, leading to optimized resource utilization, extended battery life, and improved overall system stability.

Hereinafter, an artificial intelligence agent system according to an embodiment of the present invention (hereinafter, referred to as 'PLAIF (Platform Level Agent Integration Framework)') will be described in detail.

Figure 3:
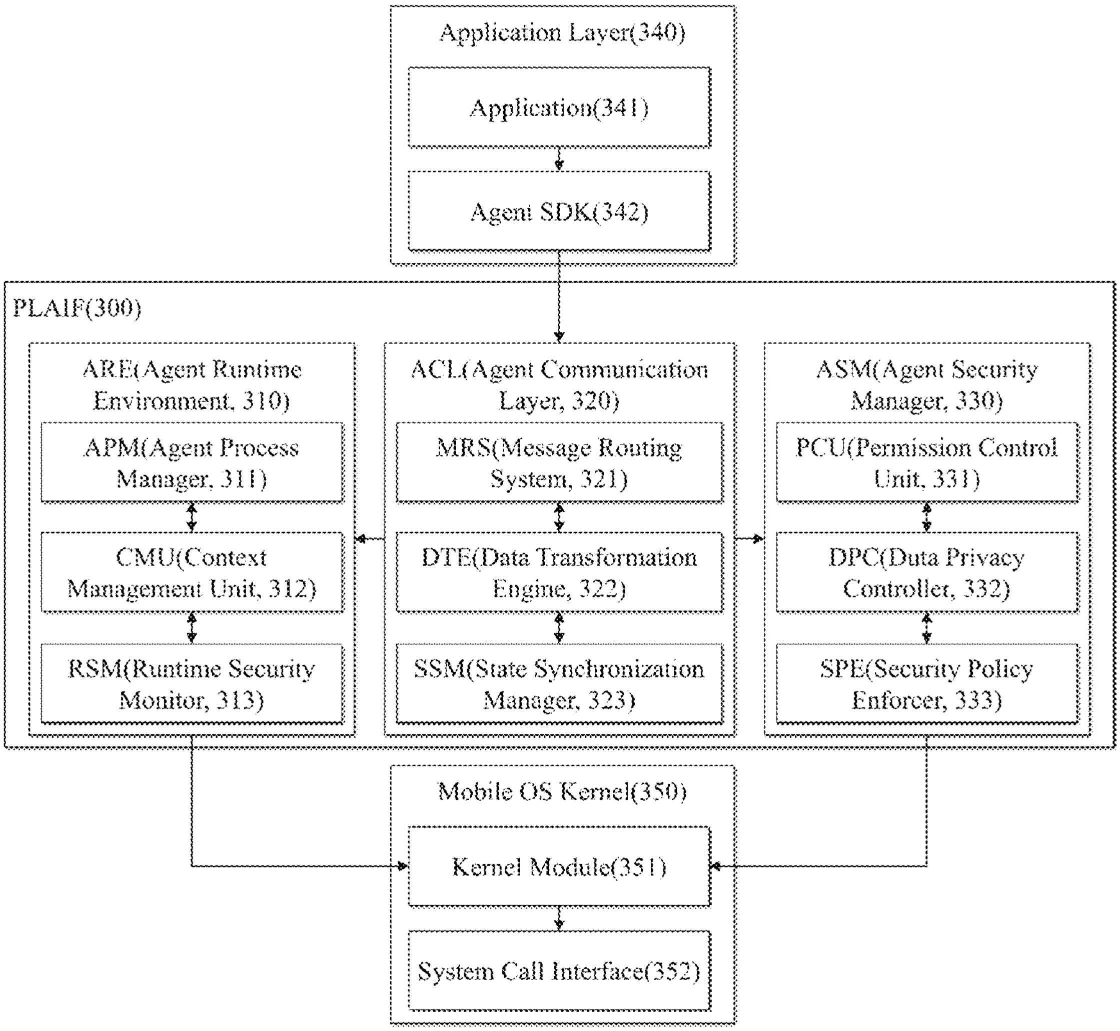
FIG. 3 is a drawing illustrating an example of an internal configuration of PLAIF (Platform Level Agent Integration Framework) according to an embodiment of the present invention.

FIG. 3 is a drawing illustrating an example of an internal configuration of PLAIF (Platform Level Agent Integration Framework) according to an embodiment of the present invention. PLAIF 300 may include ARE (Agent Runtime Environment) 310, ACL (Agent Communication Layer) 320, and ASM (Agent Security Manager) 330.

The ARE 310 provides agent runtime environment and may include, as core components, APM (Agent Process Manager) 311, CMU (Context Management Unit) 312, and RSM (Runtime Security Monitor) 313. The APM 311 may manage the lifecycle of agent processes, allocate and deallocate resources, and monitor the status in real time. The CMU 312 may synchronize context between applications and agents, manage task history, and cache status information. The RSM 313 may apply real-time security policies, verify and control permission, and detect and block malicious activities.

The operation process of the ARE 310 comprises three stages. In the initialization stage, the ARE 310 may load an ARE kernel module at system boot, allocate initial resources, and apply security policies. In the execution stage, the ARE 310 may determine the priority of the requested task, dynamically allocate necessary resources, and initiate real-time monitoring. In the task completion stage, the ARE 310 may normalize result data, deallocate and clean up resources, and store history information.

The ACL 320 may support efficient communication between agents and may include, as core components, MRS (Message Routing System) 321, DTE (Data Transformation Engine) 322, and SSM (State Synchronization Manager) 323. The MRS 321 may optimize the communication path between applications and agents, process messages based on priority, and distribute real-time load. The DTE 322 may standardize message formats, compress and optimize data, and perform error correction and recovery. The SSM 323 may synchronize state in real time, detect and resolve conflicts, and ensure consistency of the system.

Figure 4:
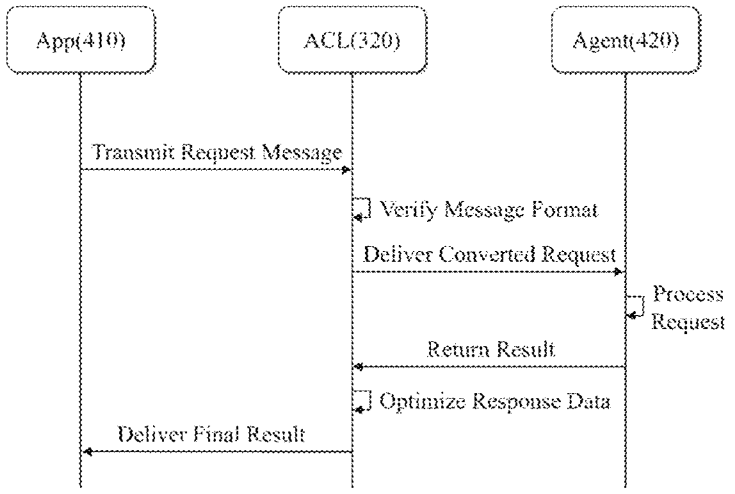
FIG. 4 is a drawing illustrating an example of communication protocol of ACL (Agent Communication Layer) according to an embodiment of the present invention.

FIG. 4 is a drawing illustrating an example of communication protocol of ACL (Agent Communication Layer) according to an embodiment of the present invention. FIG. 4 illustrates an example of a process in which the ACL 320 processes a request from an App 410 through an Agent 420 and provides the result of the request processing to the App 410. In this process, the ACL 320 may verify the format of the request message from the App 410 and optimize response data for delivering the result of the request processing of the Agent 420.

Referring again to FIG. 3, the ASM 330 is responsible for managing the security of the agent and may include, as key components, PCU (Permission Control Unit) 331, DPC (Data Privacy Controller) 332, and SPE (Security Policy Enforcer) 333. The PCU 331 may define and manage fine-grained permission, modify permission in real time, and process permission linkage rules. The DPC 332 may identify and protect sensitive information, apply encryption and anonymization to data, and manage access history. The SPE 333 may perform policy-based access control, detect threats in real time, and operate an automated response mechanism.

The security management process of the ASM 330 may be carried out in three stages. In a permission verification stage, the ASM 330 may identify the requesting entity, confirm the level of permission, and determine accessibility. In a data protection stage, the ASM 330 may filter sensitive information, apply encryption, and perform anonymization. In a monitoring stage, the ASM 330 may analyze behavior patterns, detect anomalies, and take appropriate countermeasures.

In FIG. 3, Application Layer 340 may include general mobile Application 341 and Agent SDK (Software Development Kit) 342 for integrating such Application 341 with the PLAIF 300. Also, Mobile OS Kernel 350 may include Kernel Module 351 for kernel extension of PLAIF 300 and System Call Interface 352.

The Agent SDK 342 may be a tool that helps application developers easily implement agent functions. Through this, developers can use agent functions without needing to understand the complex internal structure, and an interface for communicating with the agent in a standardized manner may be provided. The major functionalities may include initial configuration and environment setup, request processing, permission management, and state monitoring of the agent. In the initial configuration and environment setup, necessary system resources may be secured, default settings applied, and the communication environment configured. In the request processing, a request from the application may be converted into a form understandable by the agent, the priority of the request may be assigned, and the result may be returned in a manner usable by the application. In the permission management, the required permission may be checked and requested, user consent processed, and permission usage tracked. Through the state monitoring, the operational state of the agent may be checked, issues detected and reported, and performance metrics collected.

The core modules of the Agent SDK 342 may include various functionalities. The "initializeAgent" function may allocate system resources required for agent initialization, configure the runtime environment (e.g., memory limits, CPU (Central Processing Unit) usage), and initialize security policies and permission settings. Also, the "initializeAgent" function may establish a communication channel between the agent and the platform and return an agent instance as an initialization result. The "handleAgentRequest" function may convert a request received from the application into a standardized format, verify the validity of the request, and check required parameters. The "handleAgentRequest" function may also determine the processing order based on the priority of the request, perform additional validation based on the security level, and then normalize and return the result of the request processing. The "requestPermissions" function may request a list of required permission from the system, identify permission requiring user consent, and conduct the consent procedure. In addition, the "requestPermissions" function may verify and record the permission grant results, manage the scope and validity period of granted permission, and return the permission request result to the application. The "monitorAgentStatus" function may collect real-time status information of the agent and monitor the usage of resources such as CPU, memory, and network. Also, the "monitorAgentStatus" function may measure and analyze performance metrics, generate alerts upon detecting abnormal conditions, and provide the monitoring results in a stream format.

The data structures may be defined as "AgentRequest" and "AgentResponse". The "AgentRequest" structure may include a unique identifier "requestId" for identifying the request, and may include a request type "type", a list of parameters required for the request processing "parameters", a processing priority "priority", and a required security level for processing request "securityLevel". The "AgentResponse" structure may include an identifier "requestId" for the processed request, and may include a request processing result status "status", request processing result data "data", and metadata "metadata" that provides additional information (processing time, resource usage) related to the response.

The ACL 320 may manage and control all communication between the application and the agent. This ensures stable and efficient data transmission, distributes system load, and enables optimization.

Key functions of the ACL 320 may include message delivery management, data conversion and optimization, and load distribution. The message delivery management may involve selecting optimal delivery paths, adjusting the processing order based on priority, and tracking the delivery status. The data conversion and optimization may include standardizing data of various formats, applying compression to improve transmission efficiency, and performing error verification and recovery. Also, through the load distribution, system resource usage may be monitored, tasks may be appropriately distributed, and overall performance may be optimized.

A "MessageRouter" class is one of components that performs the core function of the ACL 320, and may be responsible for message routing. The "routeMessage" function may analyze the destination of a message, determine the optimal route, apply delivery priorities, and enforce security policies. Also, the "routeMessage" function may also track and record the delivery status of messages and apply retry strategies in the event of delivery failure. The "priorityQueueHandler" function may manage the queue according to priority of messages and prioritize messages requiring real-time processing. Also, the "priorityQueueHandler" function may monitor queue load status and handle timeout and overflow conditions. The "loadBalancer" function may monitor system load in real time, analyze available resources, and establish optimal distribution strategies. Through this, the "loadBalancer" function may evenly distribute tasks across processing nodes, execute automatic recovery strategies in case of failures, and continuously adjust the load distribution results.

A "DataTransformer" class may be a module responsible for data conversion and optimization within the ACL. The "normalizeData" function may convert input data of various formats into a standard format, verify validity of data, and supplement missing fields. Also, the "normalizeData" function may apply conversion rules between data formats, verify the integrity of the converted data, and return an optimized version. The "optimizeData" function may compress data to reduce size, apply encoding methods that consider transmission efficiency, and remove duplicate data to optimize the structure. Through this, the "optimizeData" function may save network bandwidth and return optimized data. Finally, the "validateAndRecover" function may verify data integrity, initiate recovery procedures in case of errors, and check and correct data consistency. Also, if an unrecoverable error occurs, the "validateAndRecover" function may perform exception handling and return validated data.

The ARE 310 may provide and manage the runtime environment for agents. Through this, the ARE 310 may efficiently allocate system resources and coordinate concurrent execution of multiple agents.

Key functionalities of the ARE 310 may include process management, task environment management, and resource optimization. The process management may involve preparing the agent runtime environment, allocating and deallocating resources, and monitoring the execution status. The task environment management may synchronize execution information, manage task history, and handle temporary data. Through the resource optimization, memory usage may be efficiently managed, processing speed improved, and storage space optimized.

A “ProcessManager” class may be a module responsible for process management within the runtime environment. The “createAgentProcess” function may initialize the environment for creating agent processes, set execution permission and security contexts, and reserve and allocate necessary system resources. Also, the “createAgentProcess” function may establish communication channels between processes, install monitoring hooks, and return the identifier and initial state information of the created process. The “allocateResources” function may check the availability of requested resources, dynamically allocate resources such as CPU, memory, and storage, and set usage limits and apply constraints. Also, the “allocateResources” function may detect and resolve resource contention, track resource usage in real time, and execute response policies in the event of shortage situations. The “manageProcessLifecycle” function may detect process state changes, control the lifecycle events such as start, pause, resume, and terminate, and initiate recovery procedures in case of abnormal termination. In addition, the “manageProcessLifecycle” function may manage inter-process dependencies, adjust execution order, record and analyze execution history, and perform automatic optimizations in case of performance degradation or errors.

A “ContextManager” class may be a module responsible for task environment management within the runtime environment. The “synchronizeContext” function may synchronize context information among multiple agents, detect and propagate changes in real time, and detect and resolve synchronization conflicts. Also, the “synchronizeContext” function may apply appropriate synchronization policies in the event of network delays or disconnections, and monitor the state to address inconsistency issues. The “manageHistory” function may chronologically record the agent’s task execution history, analyze and store outcomes and impacts, and manage the retention period and capacity of data. In addition, the “manageHistory” function may provide search and analysis functionalities, generate alerts for critical events, and derive performance improvement insights based on historical data. The “handleCache” function may store and manage frequently used data in cache, and monitor and optimize cache hit rates. Additionally, the “handleCache” function may verify and update data validity, apply caching policies considering memory usage, and execute expiration and deletion strategies. Finally, the “handleCache” function may perform synchronization operations to maintain cache consistency.

The ASM 330 may be responsible for the security of agent execution. Through this, the ASM 330 may manage data protection and privacy and establish and apply security policies.

Key functionalities of the ASM may include access permission management, data protection, security policy enforcement, and security auditing. The access permission management may perform permission validation and control, management of permission changes, and recording access history. The data protection functionality may include encryption of important information data, personal information protection, and access control for data. The security policy enforcement may involve applying security rules, detecting threats, and continuously monitoring the security state. The security auditing may record security activities, assess risks, and generate security reports.

A “PermissionController” class may be a module responsible for access permission management. The “validatePermissions” function may verify the validity of requested permission, authenticate the identity and credentials of the requestor, and apply access policies according to permission levels. In addition, the “validatePermissions” function may verify the integrity of the permission chain, record validation results in detail, and detect and block abnormal permission requests. The “updatePermissions” function may apply changes to permission settings in real time, analyze the impact of such changes, and detect and resolve conflicts with existing permission. Additionally, the “updatePermissions” function may track and record permission change history, continuously monitor the validity of updated permission, and validate system operation accordingly. The “logPermissionAccess” function may record all permission access attempts in detail, generate audit logs that include access time, subject, target, and result, and detect abnormal access patterns. Also, the “logPermissionAccess” function may ensure the integrity of log data, derive security insights through log analysis, and provide reporting functions for compliance purposes.

A “PrivacyController” class may be a module responsible for data protection and privacy management. The “encryptData” function may identify and classify sensitive data, select appropriate encryption algorithms based on data type, and generate and manage encryption keys. Also, the “encryptData” function may optimize the performance of the encryption process, verify the integrity of encrypted data, and rotate encryption keys according to key management policies. The “anonymizeData” function may detect and classify personally identifiable information, set and apply levels of anonymization, and protect personal information while maintaining statistical utility. Additionally, the “anonymizeData” function may verify the quality of anonymized data, assess and prevent re-identification risks, and manage anonymization process history. The “applyPrivacyPolicy” function may interpret and apply personal information protection policies, enforce rules related to data collection, storage, and processing, and continuously monitor policy compliance. In addition, the “applyPrivacyPolicy” function may detect and respond to policy violations, verify and report the results of policy enforcement, and update policies in accordance with new regulatory requirements.

A “PolicyEnforcer” class may be a module responsible for enforcing security policies and detecting threats. Through this, the “PolicyEnforcer” class may enhance system security and perform automated responses. The “enforceSecurityPolicy” function may apply security policy rules to the system, manage policy enforcement priorities, and detect and resolve conflicts between policies. Also, the “enforceSecurityPolicy” function may monitor the status of policy enforcement in real time, verify and report enforcement results, and handle and record exception cases. The “detectThreats” function may monitor system activities in real time, detect and analyze anomalous behavior patterns, and assess and classify threat levels. In addition, the “detectThreats” function may collect detailed information on detected threats, notify immediately, and perform verification to minimize false positives. The "automaticResponse" function may establish response strategies for detected threats, execute automated responses based on threat levels, and perform immediate actions to protect the system. Additionally, the "automaticResponse" function may analyze and adjust the impact of response actions, record and evaluate response results, and continuously improve the effectiveness of response strategies.

Through this architecture, the PLAIF 300 may provide a robust agent runtime environment, an efficient communication framework, and thorough security management, enabling agents to achieve optimal performance in an On-Device AI environment.

Figure 5:
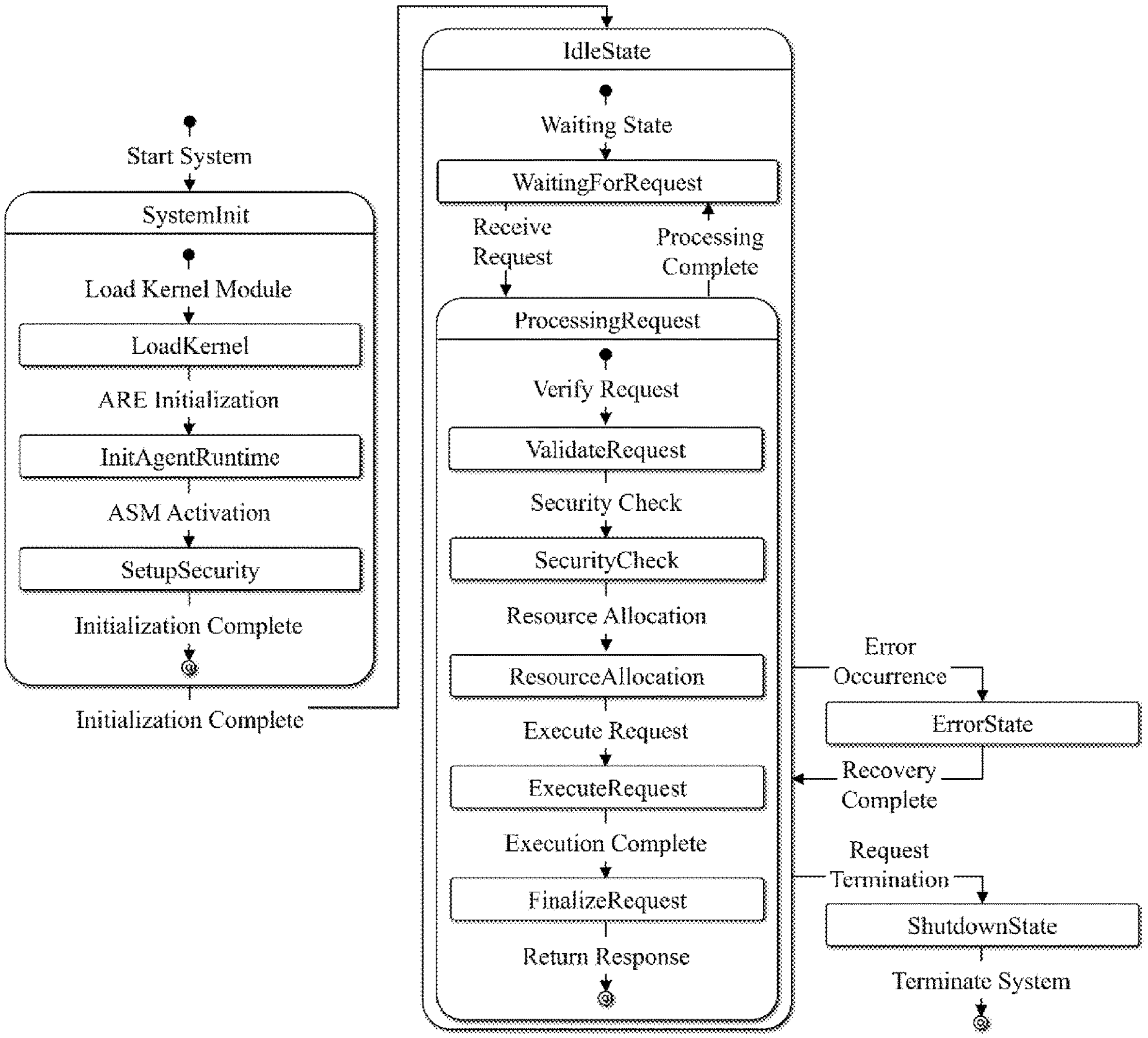
FIG. 5 is a drawing illustrating an example of operation process of PLAIF according to an embodiment of the present invention.

FIG. 5 is a drawing illustrating an example of operation process of PLAIF according to an embodiment of the present invention. The operation process of the PLAIF 300 may be composed of four main processes: system initialization, request processing, error handling, and system termination.

The system initialization process may be a process in which the PLAIF 300 loads essential kernel modules, configures the runtime environment, and activates the security system when the system starts, and may include a process of kernel module loading, a process of runtime environment initialization (ARE initialization), and a process of security system activation (ASM activation).

In the process of kernel module loading, the PLAIF 300 may load essential kernel modules when the system starts, allocate basic system resources, and apply initial set values.

In the process of runtime environment initialization, the PLAIF 300 may configure the agent runtime environment, initialize memory and process managers, and begin system monitoring.

In the process of security system activation (ASM activation), the PLAIF 300 may load security policies, initialize the permission management system, and start audit logging.

The request processing process is a process in which the PLAIF 300 processes an external request, and may include the process from receiving a request to returning a response.

In the request reception and verification process, the PLAIF 300 may receive a request from an application, verify the request's validity, and confirm necessary permission.

In the security check process, the PLAIF 300 may apply security policies, verify access permission, and check potential threats.

In the resource allocation process, the PLAIF 300 may determine the necessary system resources to execute the request, check resource availability, and allocate appropriate resources.

In the request execution process, the PLAIF 300 may execute the request within the allocated environment, monitor execution status, and collect results.

In the response return process, the PLAIF 300 may organize the execution results, clean up the used resources, and return the final result to the application.

The error handling process may include a process in which the PLAIF 300 detects and recovers errors occurred in the system. At this time, as the process for detecting errors, the PLAIF 300 may detect system errors, collect error information, and assess impact severity. Also, as the process for recovery processing, the PLAIF 300 may stabilize the error condition, perform necessary recovery operations, and restore the system to a normal state.

The system termination process may include a process in which the PLAIF 300 cleans up running tasks and verifies security status for safe termination when the system terminates. At this time, as the termination preparation process, the PLAIF 300 may clean up running tasks, recover resources, and clear temporary data. Also, as the final termination process, the PLAIF 300 may verify the security state, store logs, and safely terminate the system.

Figure 6:
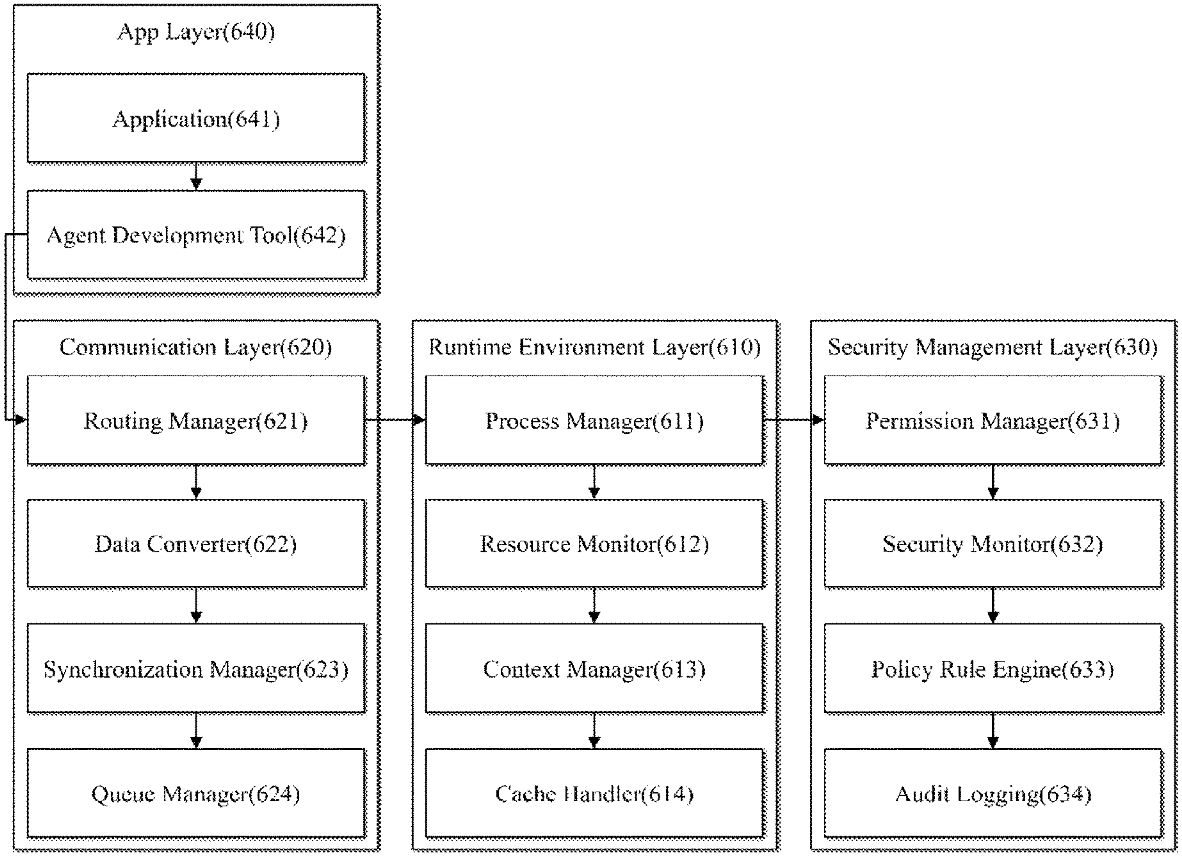
FIG. 6 is a drawing illustrating an example of detailed structure of PLAIF components according to an embodiment of the present invention.

FIG. 6 is a drawing illustrating an example of detailed structure of PLAIF according to an embodiment of the present invention. FIG. 6 illustrates a runtime environment layer 610, a communication layer 620, a security management layer 630, and an app layer 640. Here, the runtime environment layer 610, the communication layer 620, and the security management layer 630 may correspond to the ARE 310, ACL 320, and ASM 330 described with reference to FIG. 3, and the app layer 640 may correspond to the application layer 340 also described with reference to FIG. 3.

In the app layer 640, user requests received via an application 641 may be used to identify tasks that require agent operations. The identified tasks may be converted into a format understandable by an agent development tool 642, and may be tagged with a priority and importance determined for the tasks. Also, required permission and resource requirements may be specified. The agent development tool 642 may normalize the request received from the application 641 into a standardized format. The agent development tool 642 may attach the necessary security tokens and authentication information to the user's request and collect context information required for task execution to include it in the user's request. Finally, the agent development tool 642 may package the user's request into a message format for transmission to the lower layers.

A routing manager 621 of the communication layer 620 may analyze the destination of the request received from the agent development tool 642 and determine the optimal processing path by confirming system load status. Depending on priority, the request may be processed immediately or placed in a queue, and the routing manager 621 may monitor the processing status and manage timeouts. A data converter 622 may verify the format of received data and convert it if necessary. At this time, large-scale data may be divided and processed in chunk units, and in case of important data, compression and encryption may be applied. The data converter 622 may also verify the integrity of the converted data. A synchronization manager 623 may manage data synchronization across multiple agents. The synchronization manager 623 may detect and resolve data version conflicts, and may identify data requiring real-time synchronization and process it with priority. Also, the synchronization manager 623 may execute recovery procedures in case of synchronization failures. A queue manager 624 may manage the priority of tasks waiting to be processed. The queue manager 624 may adjust processing speed based on system load, and handle timeouts for tasks with long wait times. In addition, the queue manager 624 may monitor queue status, and manage overload situations.

A process manager 611 of the runtime environment layer 610 may manage the creation and termination of agent processes. The process manager 611 may set and control resource allocations for process, and may coordinate and manage communication between processes. Also, the process manager 611 may detect and clean up abnormal processes. A resource monitor 612 may monitor usage of resources such as CPU, memory, and storage, in real-time. In addition, the resource monitor 612 may predict resource shortages and generate alerts, analyze resource usage efficiency, and suggest optimization strategies. Finally, the resource monitor 612 may generate resource usage reports. A context manager 613 may collect and manage the execution context information of agents. The context manager 613 may also track and record context changes, and synchronize context information between related agents. In addition, the context manager 613 may create and manage context restoration points. A cache handler 614 may identify frequently used data and store it in cache. Also, the cache handler 614 may periodically verify the validity of cached data, and monitor cache hit rates to optimize it. Additionally, the cache handler 614 may efficiently manage cache memory.

A permission manager 631 of the security management layer 630 may verify the required permissions for the requested tasks. Also, the permission manager 631 may check and manage agent permission levels, and may track and record permission changes. In addition, the permission manager 631 may block and report unauthorized access attempts. A security monitor 632 may monitor the overall security status of the system in real-time. Also, the security monitor 632 may detect and analyze abnormal behaviors and patterns, assess threat levels, and respond accordingly. Additionally, the security monitor 632 may generate and manage security event logs. A policy rule engine 633 may interpret and apply set security policies. The policy rule engine 633 may also detect and resolve policy rule conflicts, and monitor the result of policy application. In addition, the policy rule engine 633 may manage and deploy policy updates. An audit logging 634 may record and store all security-related activities. The audit logging 634 may generate detailed logs for key security events, analyze log data to derive security insights, and generate reports that meet audit requirements.

FIGS. 7 to 10 are drawings illustrating examples of operation process of PLAIF components according to an embodiment of the present invention.

Figure 7:
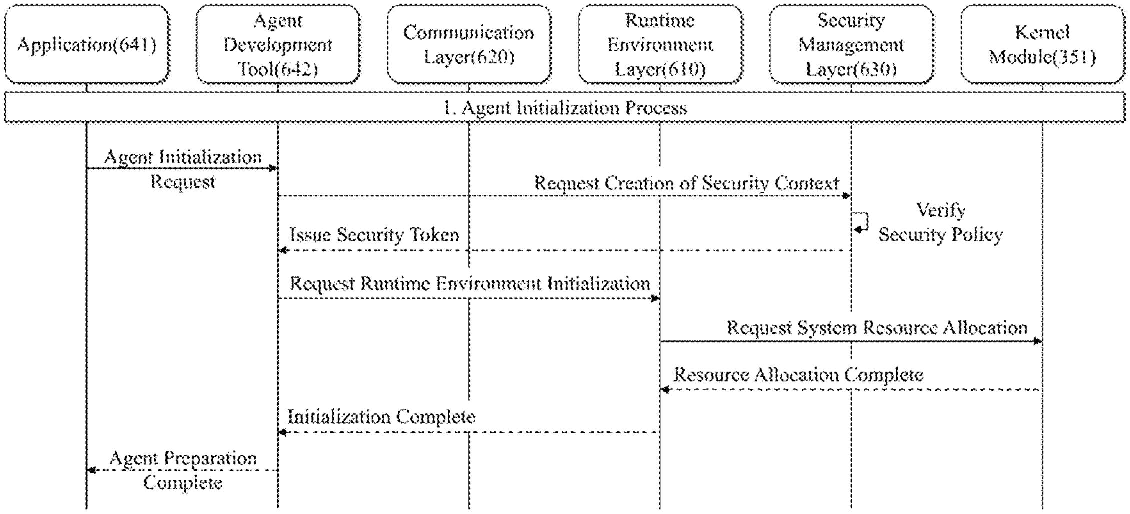
FIGS. 7 to 10 are drawings illustrating examples of operation process of PLAIF components according to an embodiment of the present invention.

In an agent initialization process of FIG. 7, the application 641 may request agent initialization to the agent development tool 642. The agent development tool 642 may request creation of a security context to the security management layer 630, and the security management layer 630 may issue a security token to the agent development tool 642 after verifying security policies. Subsequently, the agent development tool 642 may request runtime environment initialization to the runtime environment layer 610, and the runtime environment layer 610 may request system resource allocation to the Kernel Module 351. Once system resources are allocated in the Kernel Module 351, an initialization completion status may be delivered to the application 641 via the runtime environment layer 610 and the agent development tool 642. Key processing operations of the agent initialization process may include verification of security policies and issuance of tokens, allocation and initialization of system resources, configuration and preparation of the runtime environment, and verification and reporting of the initialization state.

Figure 8:
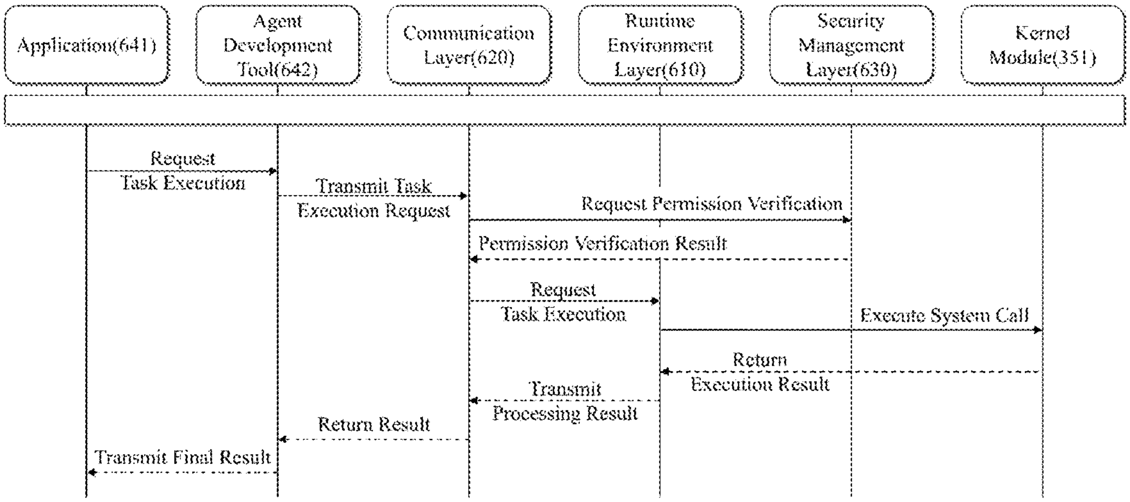

In a task request and execution process of FIG. 8, the application 641 may request task execution to the agent development tool 642, and the agent development tool 642 may transmit the task execution request to the communication layer 620. The communication layer 620 may perform permission verification via the security management layer 630, and transmit the task execution request to the runtime environment layer 610. The runtime environment layer 610 may execute a system call to the Kernel Module 351, and the task may be processed by the Kernel Module 351. The result of the task processing in the Kernel Module 351 may be returned to the application via the runtime environment layer 610, the communication layer 620, and the agent development tool 642. Key processing operations of the task request and execution process may include task request verification and conversion, permission and security status check, system resource access and processing, and normalization and delivery of result data.

Figure 9:
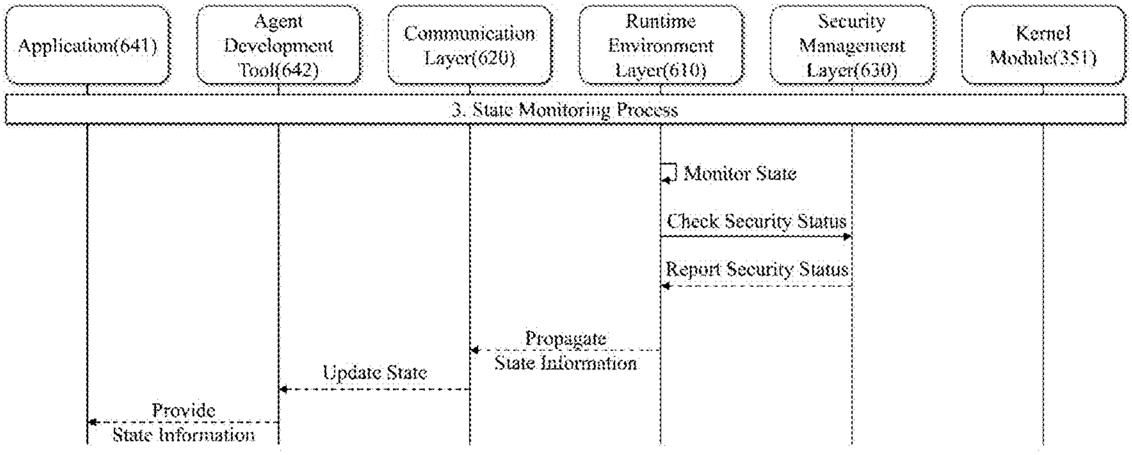

In a state monitoring process of FIG. 9, the runtime environment layer 610 may perform state monitoring. Also, the runtime environment layer 610 may periodically check the security status via the security management layer 630, and state information may be propagated throughout the system (the communication layer 620 and the agent development tool 642). The latest state information may be provided to the application 641 by the agent development tool 642. Key processing operations of the state monitoring process may include real-time monitoring of system state, verification and analysis of security status, synchronization and propagation of state information, and reporting and notification of monitoring results.

Figure 10:
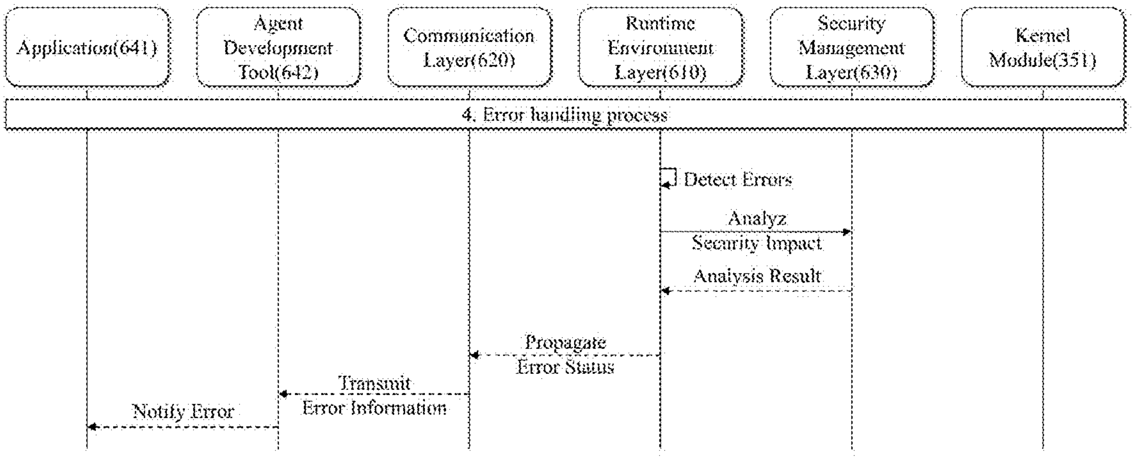

In an error handling process of FIG. 10, the runtime environment layer 610 may detect errors. Also, the runtime environment layer 610 may analyze and evaluate the security impact via the security management layer 630, and the error states may be propagated to the system (the communication layer 620 and the agent development tool 642). The error information may be delivered as notifications to the application 641 by the agent development tool 642. Key processing operations of the error handling process may include detection and analysis of error situations, evaluation of security impact, propagation and synchronization of error information, and execution of error recovery procedures.

FIGS. 11 to 15 are drawings illustrating examples of integration process between PLAIF and peripheral systems according to an embodiment of the present invention.

Figure 11:
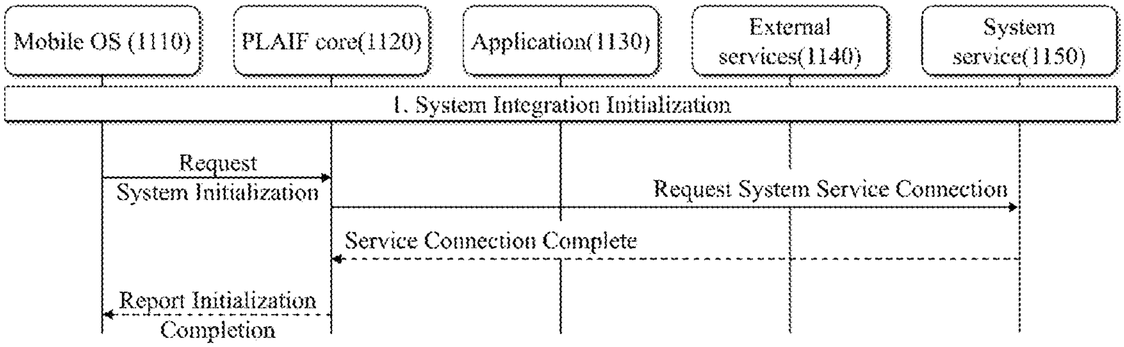
FIGS. 11 to 15 are drawings illustrating examples of integration process between PLAIF and peripheral systems according to an embodiment of the present invention.

In a system integration initialization process of FIG. 11, a mobile OS 1110 may request system initialization to a PLAIF core 1120, and the PLAIF core 1120 may establish connections with a necessary system service 1150. After this, the PLAIF core 1120 may check availability of the system service 1150 and verify the connections, and then, report the completion of initialization to the mobile OS 1110. Key integration points of the system integration initialization process may include management of system service connections, service status monitoring, synchronization of initial settings, and system resource initialization.

Figure 12:
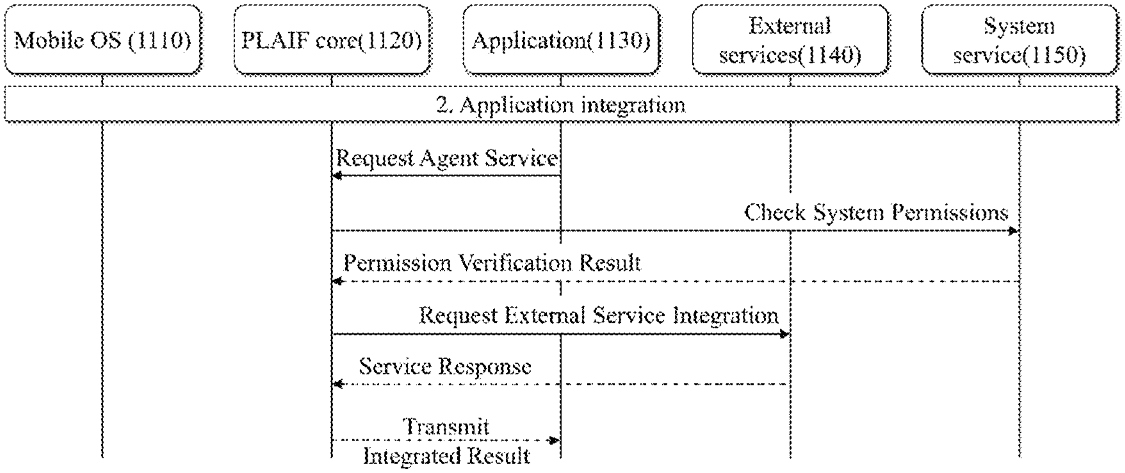

In an app integration process of FIG. 12, an application 1130 may request an agent service via the PLAIF core 1120, and the PLAIF core 1120 may check and verify system permissions through the system service 1150, and then process integration with external services 1140. At this time, the PLAIF core 1120 may deliver the processed result to the application 1130. Key integration points of the app integration process may include app permission management, external service integration, integrated data processing, result deliver and synchronization.

Figure 13:
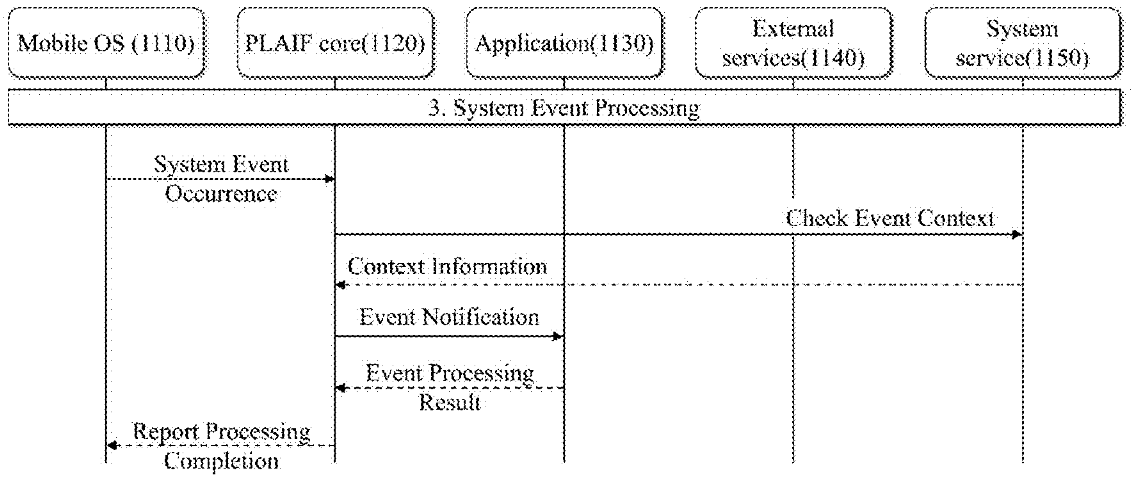

In a system event handling process of FIG. 13, when a system event occurs from the mobile OS 1110, the PLAIF core 1120 may check event context information via the system service 1150, and then propagate event notifications to the application 1130. After this, the PLAIF core 1120 may collect the result of processing from the application 1130 and report it to the mobile OS 1110. Key integration points of the system event handling process may include event detection and classification, context information management, event propagation framework, and result collection and reporting.

Figure 14:
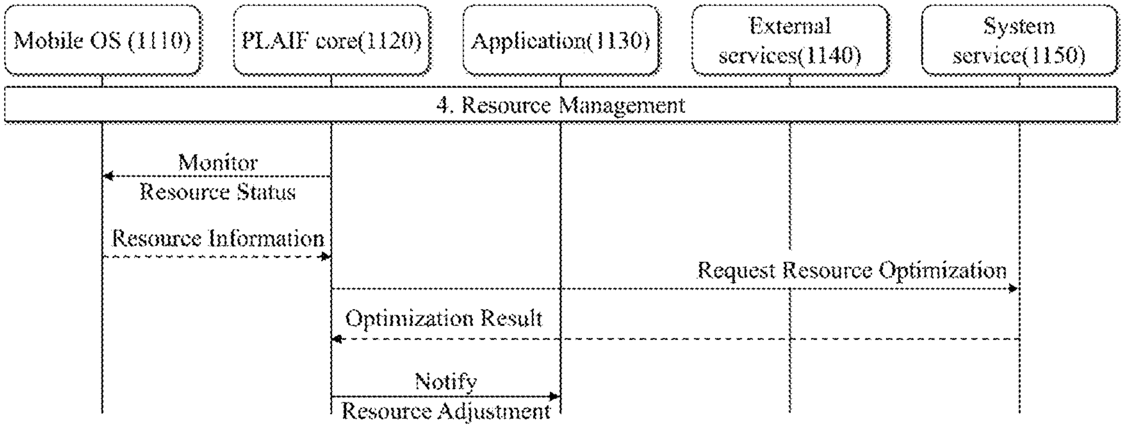

In a resource management process of FIG. 14, the PLAIF core 1120 may continuously monitor system resource status, analyze the current resource usage status, and if necessary, perform resource optimization via the system service 1150.

The PLAIF core 1120 may then notify the adjusted resource-related information to the application 1130. Key integration points of the resource management process may include resource monitoring, usage analysis, optimization execution, and status notification handling.

Figure 15:
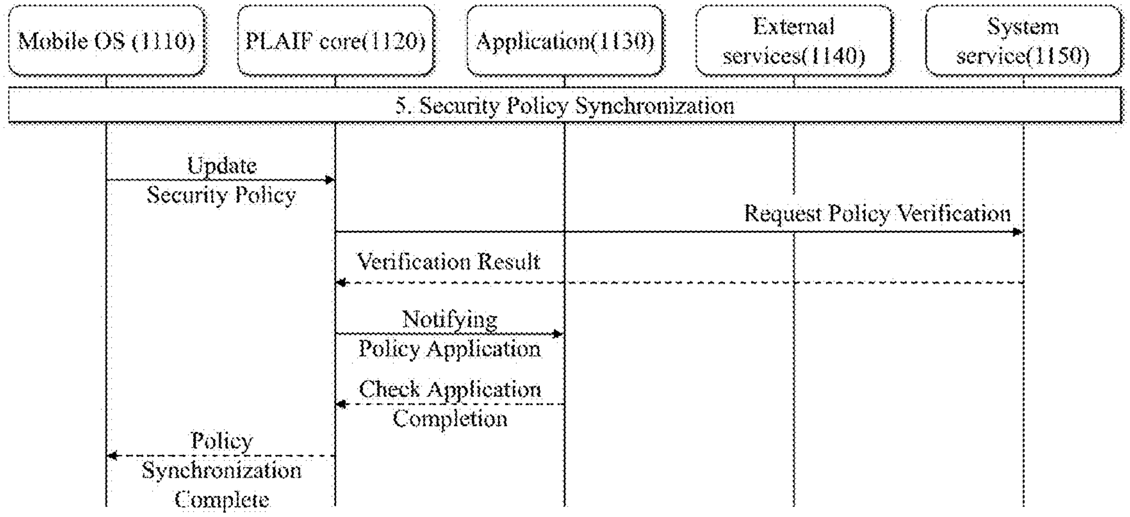

In a security policy synchronization process of FIG. 15, the PLAIF core 1120 may receive security policy updates from the mobile OS 1110, and then verify validity of the policy via the system service 1150. After this, the PLAIF core 1120 may apply the updated policy to the application 1130, check policy application status, and report it to the mobile OS 1110. Key integration points of the security policy synchronization process may include policy update management, policy verification framework, policy application process, and synchronization status management.

Figure 16:
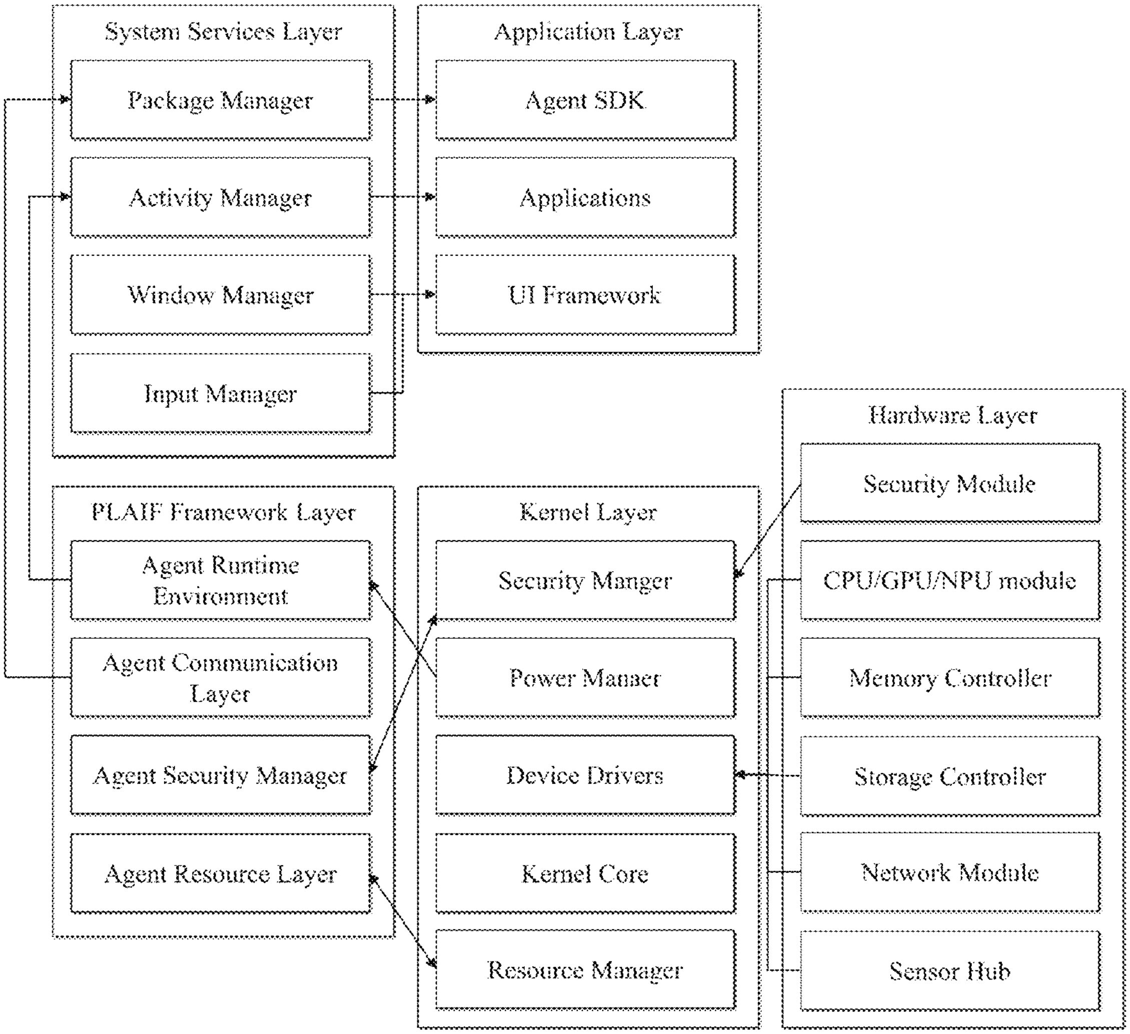
FIG. 16 is a drawing illustrating an example of system design including integration between a mobile OS and hardware modules according to an embodiment of the present invention.
Figure 17:
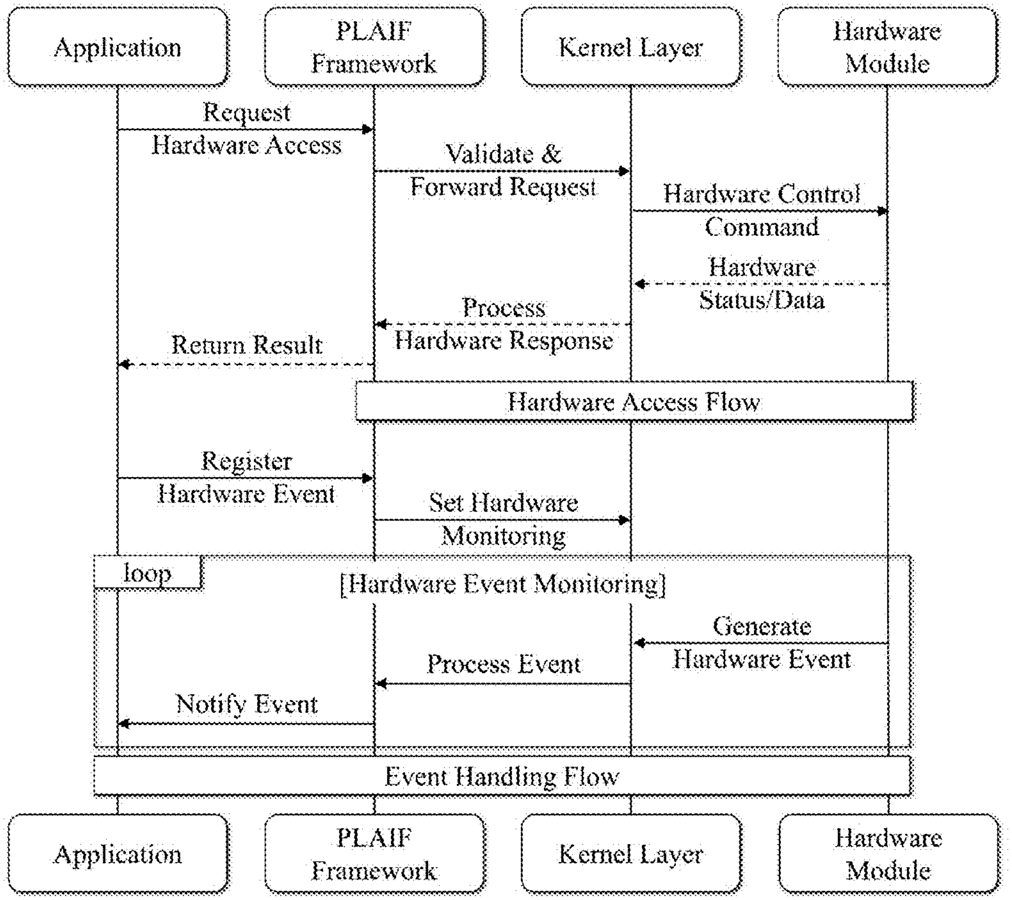
FIG. 17 is a drawing illustrating an example of a hardware integration sequence according to an embodiment of the present invention.

FIG. 16 is a drawing illustrating an example of system design including integration between a mobile OS and hardware modules according to an embodiment of the present invention, and FIG. 17 is a drawing illustrating an example of a hardware integration sequence according to an embodiment of the present invention.

In Hardware Layer integration, CPU/GPU (Graphics Processing Unit)/NPU (Neural Processing Unit) modules may support hardware acceleration for AI agent processing, and a memory controller may be responsible for efficient memory management of the agent runtime. A storage controller may manage persistent storage of agent data, while a sensor hub may provide an integrated interface with various hardware sensors. In addition, a security module may support hardware-based encryption and security functions.

In Kernel Layer integration, a device driver may provide an interface for directly controlling hardware, and a resource manager may perform allocation and management of hardware resources. A security manager may apply hardware-level security policies, and a power manager may optimize hardware performance and power consumption.

In PLAIF Framework Layer integration, an ARE (Agent Runtime Environment) may execute agents by efficiently utilizing hardware resources, and an ACL (Agent Communication Layer) may provide high-performance communication by utilizing hardware acceleration. In addition, an ASM (Agent Security Manager) may enhance security by integrating with hardware security modules, and an ARL (Agent Resource Layer) may support optimized utilization of hardware resources.

Figure 18:
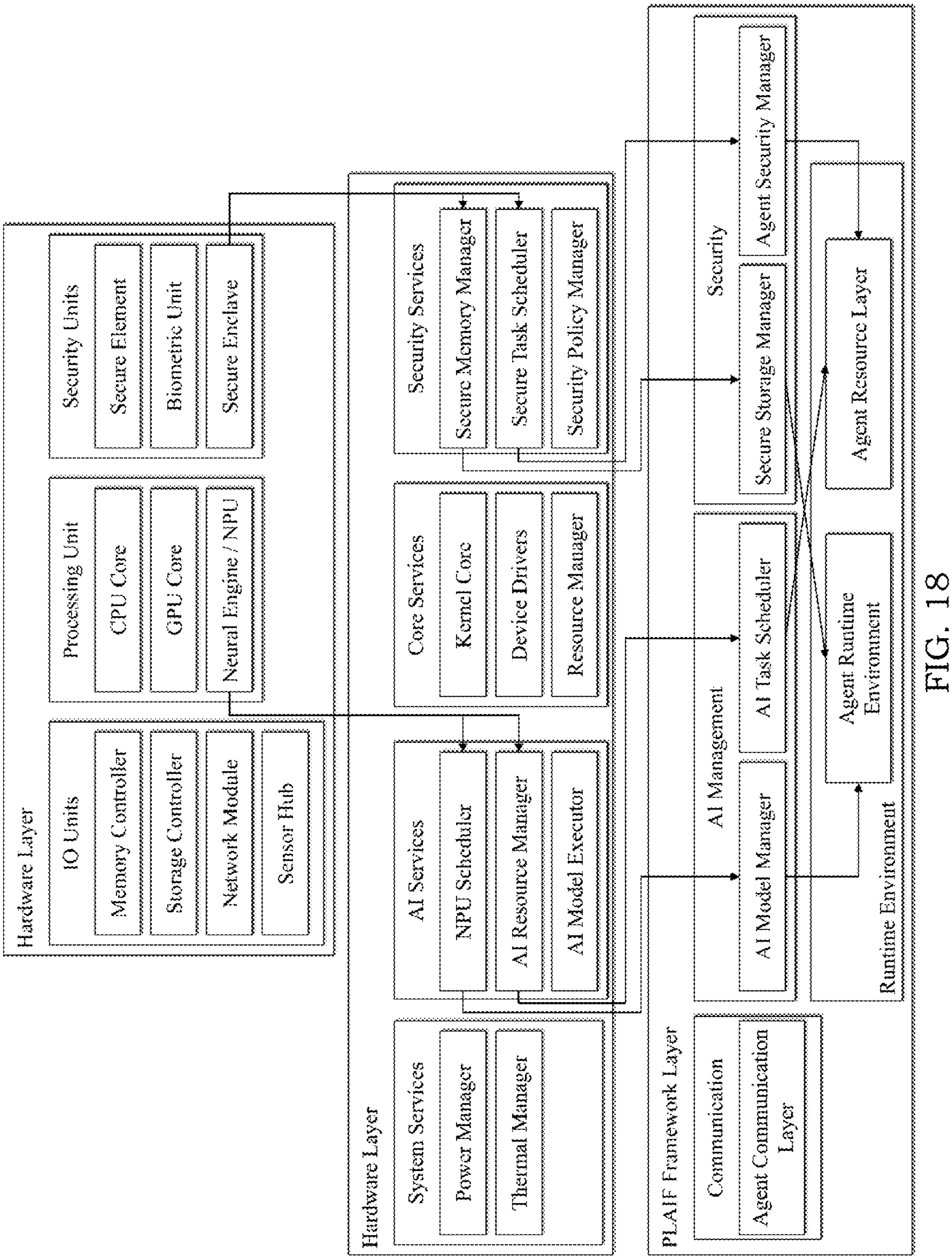
FIG. 18 is a drawing illustrating an example of a mobile OS architecture integrated with AI and security hardware according to an embodiment of the present invention.
Figure 19:
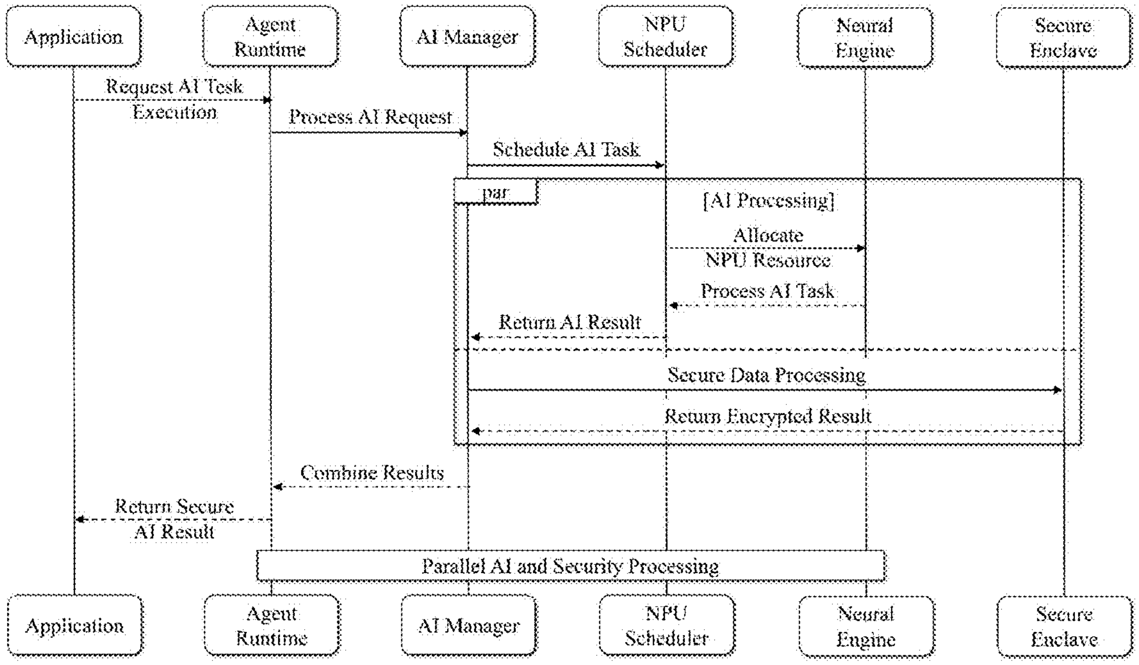
FIG. 19 is a drawing illustrating an example of an AI and security processing sequence according to an embodiment of the present invention.

FIG. 18 is a drawing illustrating an example of a mobile OS architecture integrated with AI and security hardware according to an embodiment of the present invention, and FIG. 19 is a drawing illustrating an example of an AI and security processing sequence according to an embodiment of the present invention. This embodiment illustrates an example of a hardware-integrated design architecture centered on an NPU and a Secure Enclave.

In hardware layer enhancement, a Neural Engine/NPU is added as a dedicated processor for executing AI models, supporting low-power, high-performance AI processing. This enables simultaneous processing of multiple AI models. In addition, the Secure Enclave is added, equipped with an independent security processor, and may perform encryption key management and biometric authentication processing. The capability to store security data in isolation may be supported.

In kernel layer extension, AI services are added such that an NPU Scheduler optimally allocates AI tasks, and an AI Resource Manager manages AI resources. A Model Executor may manage execution of AI models. Security services are also enhanced, allowing a Secure Task Scheduler to manage security tasks and a Secure Memory Manager to manage secure memory. A Security Policy Manager may apply security policies.

In PLAIF framework enhancement, AI management functions are added so that an AI Model Manager manages the lifecycle of AI models, and an AI Task Scheduler optimizes AI tasks. In addition, security management is strengthened, allowing a Secure Storage Manager to be responsible for secure data storage, and an enhanced ASM (Agent Security Manager) may be integrated with hardware security.

Key features may include AI processing optimization, enhanced security, and system integration. From the perspective of AI processing optimization, dedicated AI processing through the NPU improves performance and enables efficient execution and resource management of AI models, as well as supporting concurrent processing of multiple AI models. From the perspective of enhanced security, it may provide hardware-based data encryption, secure processing of biometric authentication data, and isolated storage and handling of sensitive information. From the perspective of system integration, it organically links AI and security functions, enabling efficient resource management and task scheduling, and may also provide a secure and high-speed data processing pipeline.

Figure 20:
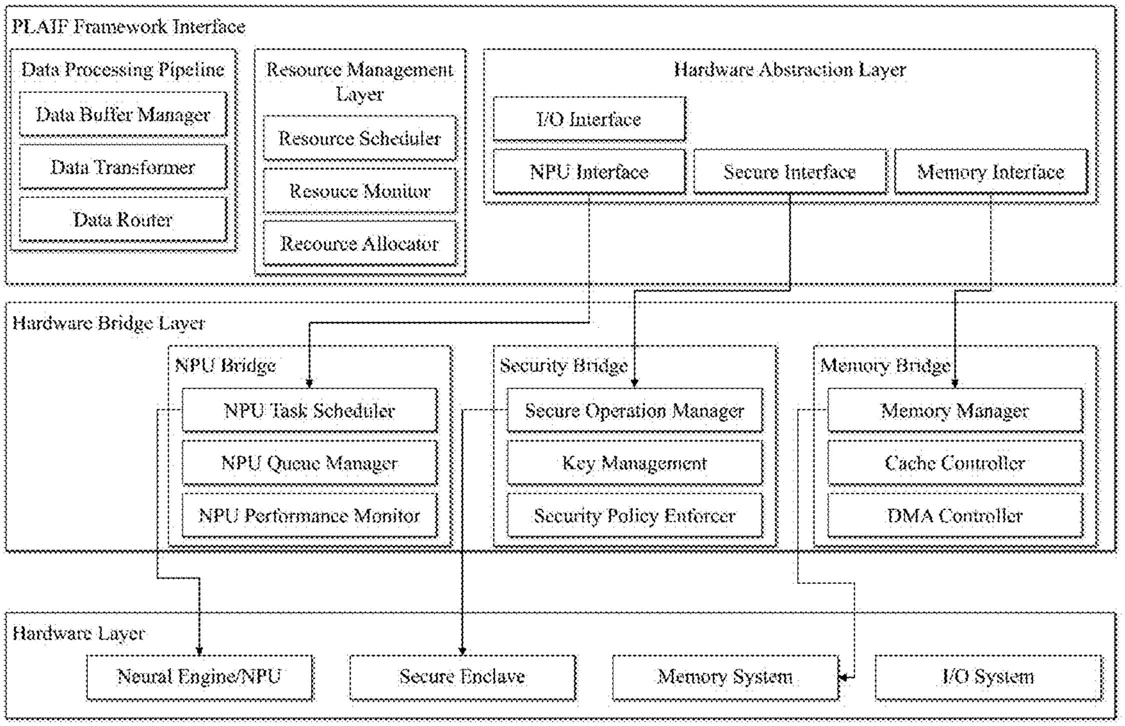
FIG. 20 is a drawing illustrating an example of an interface structure between PLAIF and hardware according to an embodiment of the present invention.

FIG. 20 is a drawing illustrating an example of an interface structure between PLAIF and hardware according to an embodiment of the present invention.

In Hardware Abstraction Layer, an NPU interface processes AI model execution requests, allocates NPU resources, and controls task priorities. It also monitors execution status to support efficient AI model execution. A security interface requests Secure Enclave operations, provides a security key management interface, and handles encryption tasks and application of security policies. A memory interface manages shared memory, controls cache, manages DMA (Direct Memory Access) operations, and performs memory protection.

In Hardware Bridge Layer, an NPU bridge may manage task queues, monitor real-time performance, track resource usage, and handle error recovery. A security bridge may schedule security tasks, manage the lifecycle of keys, enforce security policies, and generate audit logs. A memory bridge may optimize memory allocation, manage cache policies, control DMA channels, and synchronize memory.

In data processing pipeline, buffer management may manage input/output buffer pools, apply data caching strategies, and optimize memory reuse. In data transformation process, it may handle format conversion, manage compression and decompression, and normalize data. In data routing, it may optimize processing paths, perform priority-based routing, and distribute loads.

Key features of the main interfaces may include performance optimization, enhanced security, and provision of scalability. From the perspective of performance optimization, the system efficiency may be improved through zero-copy data transmission, DMA-based high-speed data movement, hardware acceleration utilization, and parallel processing optimization. From the perspective of enhanced security, data protection may be strengthened through hardware-based encryption, secure memory separation, enhanced access control, and real-time security monitoring. From the perspective of provision of scalability, flexible system configuration may be enabled through modular architecture design, definition of standard interfaces, dynamic resource management, and supporting for plugin architectures.

Figure 21:
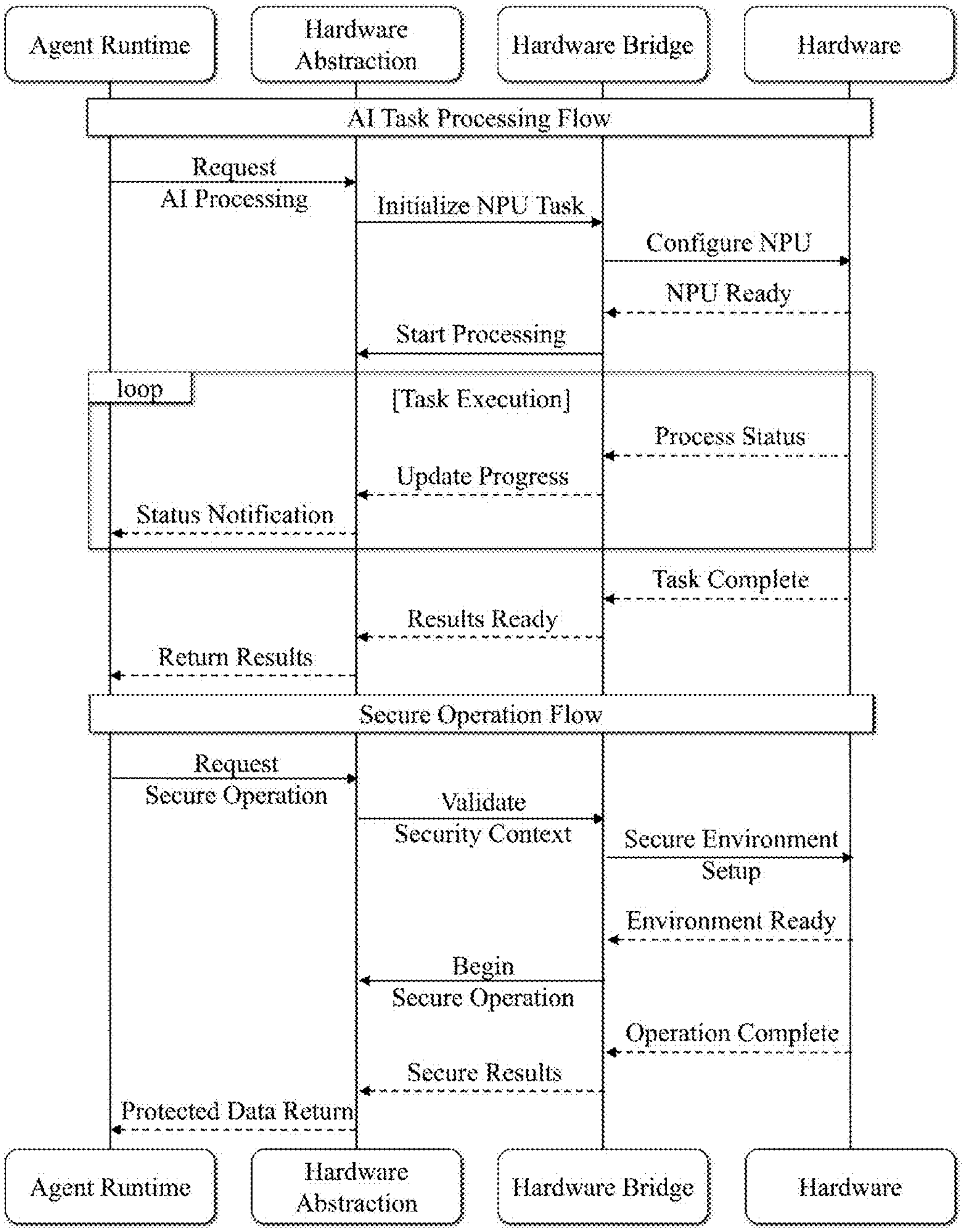
FIG. 21 is a drawing illustrating an example of a PLAIF hardware interface sequence according to an embodiment of the present invention.

FIG. 21 is a drawing illustrating an example of a PLAIF hardware interface sequence according to an embodiment of the present invention.

The AI task processing flow may proceed through multiple stages. In AI task initialization stage, task request data may be transmitted from Agent Runtime to HAL (Hardware Abstraction Layer). Table 1 below illustrates an example of the structure of the task request data.

TABLE 1

```json
{
  "task__id": "unique__task__identifier",
  "model__id": "ai__model__identifier",
  "priority": "high/medium/low",
  "input__data": "input__data__reference",
  "execution__params": {
    "batch__size": "batch__size__value",
    "precision": "precision__level",
    "timeout": "timeout__value"
  }
}
```

In NPU task setting stage, the HAL may deliver NPU configuration information to Hardware Bridge. This information may include the AI model loading location, memory allocation details, execution priority, and resource constraints, etc. The Hardware Bridge may then perform hardware-level setting on NPU Hardware, which may include adjusting NPU clock speed, allocating memory bandwidth, setting power management profiles, and configuring task queues. In task execution monitoring stage, the execution status may be continuously checked, and operations such as progress tracking, performance metric collection, error status verification, and resource usage monitoring. Table 2 below illustrates an example of progress tracking.

TABLE 2

```json
{
  "progress": "percentage__complete",
  "current__state": "processing__state",
  "resource__usage": {
    "compute": "compute__usage",
    "memory": "memory__usage",
    "power": "power__consumption"
  }
}
```

In result return stage, the NPU Hardware may transmit processed result data, execution statistic information, and a resource usage report to the Hardware Bridge. This information may then be delivered to the Agent Runtime via the HAL. Table 3 below illustrates an example structure of the final result data.

TABLE 3

```json
{
  "task__id": "original__task__id",
  "status": "success/failure",
  "result__data": "processed__data",
  "execution__stats": {
```

TABLE 3-continued

```
    "processing__time": "time__taken",
    "resource__usage": "resource__statistics",
    "accuracy__metrics": "accuracy__data"
  }
}
```

The security task processing flow may follow similar stages. In security task initialization stage, a security task request may be transmitted from the Agent Runtime to the HAL. Table 4 below illustrates an example structure of the security task request.

TABLE 4

```json
{
  "operation__id": "secure__operation__identifier",
  "operation__type": "encryption/signing/verification",
  "security__level": "security__requirement__level",
  "input__data": "protected__data__reference"
}
```

In security environment setting stage, the HAL performs security context setting through Security Bridge, which may include processes such as verifying security policies, validating access permissions, and preparing key material. Subsequently, the Security Bridge initializes the security environment in Secure Enclave, including secure memory allocation, encryption key loading, and application of security policies. In security task execution stage, the Secure Enclave may perform operations such as data encryption and decryption, integrity verification, and digital signature generation and verification. In security result return stage, the Secure Enclave may deliver the security processing results to the HAL and the Agent Runtime through the Security Bridge. Table 5 below illustrates an example structure of the security processing results.

TABLE 5

```json
{
  "operation__id": "original__operation__id",
  "status": "success/failure",
  "secure__result": "protected__result__data",
  "security__metadata": {
    "verification__token": "verification__data",
    "timestamp": "operation__timestamp",
    "security__level": "achieved__security__level"
  }
}
```

Error handling and recovery mechanisms may also be critical elements. In error detection process, hardware-level errors, security violations detection, resource shortage conditions, and timeout situations may be detected. In the recovery process, approaches such as automatic retry mechanisms, alternative execution path selection, resource reallocation, and error logging and reporting may be applied.

Figure 22:
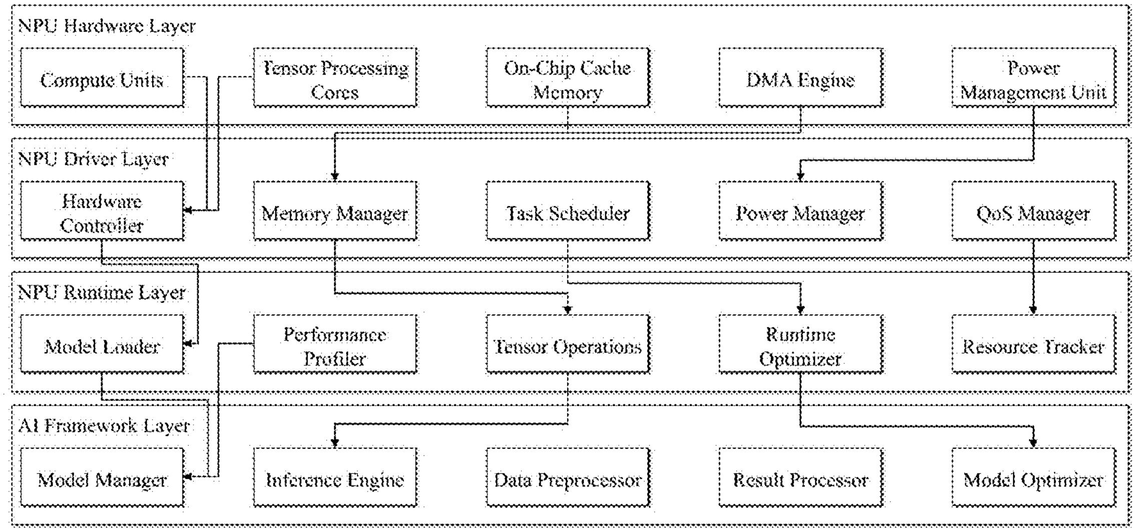
FIG. 22 is a drawing illustrating an example of an NPU-based AI processing pipeline structure according to an embodiment of the present invention.

FIG. 22 is a drawing illustrating an example of an NPU-based AI processing pipeline structure according to an embodiment of the present invention.

NPU Hardware Layer may be composed of multiple components. Compute Units are processing units dedicated to AI operations, optimized for parallel processing, and may support dynamic clock adjustment. Tensor Processing Cores accelerate matrix operations, are optimized for deep learning models, and may perform real-time inference processing. A Cache Memory serves as high-speed on-chip memory, optimizing data locality and supporting multi-level caching.

NPU Driver Layer may perform various functions. A Task Scheduler manages priorities of AI tasks, optimizes resource allocation, and may distribute real-time tasks. A Memory Manager manages memory pools, optimizes DMA operations, and may control cache policies. A QoS (Quality of Service) Manger manages performance targets, monitors resource usage, and may dynamically adjust performance.

NPU Runtime Layer may serve to optimize model execution. A Model Loader verifies model files, optimizes memory usage and load it, and may support version management. A Runtime Optimizer optimizes performance in real time, dynamically adjusts workloads, and may improve resource efficiency. A Performance Profiler collects performance metrics, analyzes bottlenecks, and may identify areas that require optimization.

AI Framework Layer may manage models and perform inference. A Model Manager manages the lifecycle of models, performs version control and updates, and may verify model integrity. An Inference Engine manages the inference pipeline, optimizes batch processing, and may evaluate the reliability of results.

Figure 23:
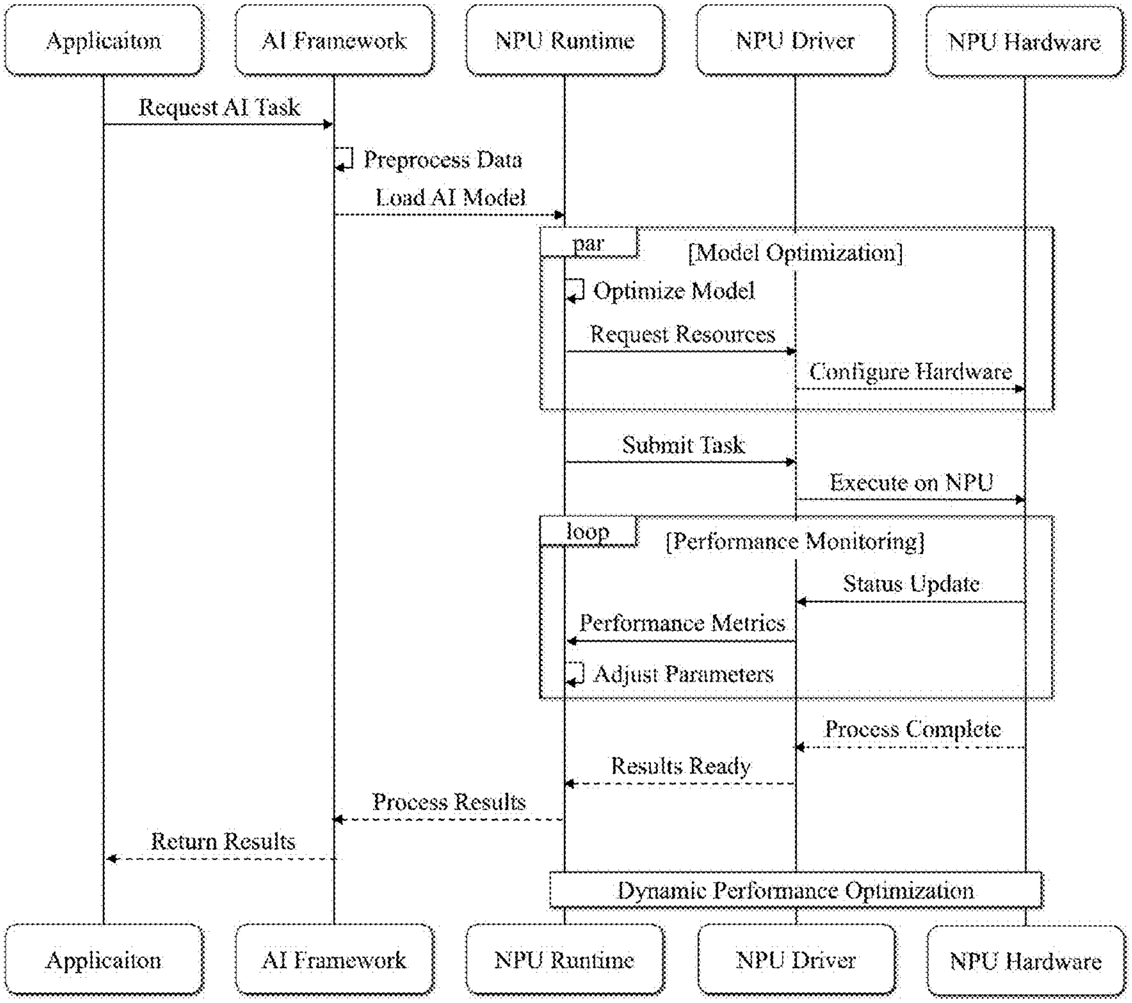
FIG. 23 is a drawing illustrating an example of an NPU processing sequence according to an embodiment of the present invention.

FIG. 23 is a drawing illustrating an example of an NPU processing sequence according to an embodiment of the present invention. The main processing flow of the NPU sequence may be divided into several stages. In an AI task initialization stage, the model may be loaded and optimized, resources may be allocated and configured, and the runtime environment may be prepared. In an execution stage, input data may be preprocessed, NPU tasks may be scheduled, and parallel processing optimization may be performed. In a monitoring and optimization stage, real-time performance may be monitored, resources may be dynamically adjusted, and the achievement of QoS targets may be managed. In a result processing stage, inference results may be post-processed, the reliability of results may be evaluated, and response data may be transmitted.

Figure 24:
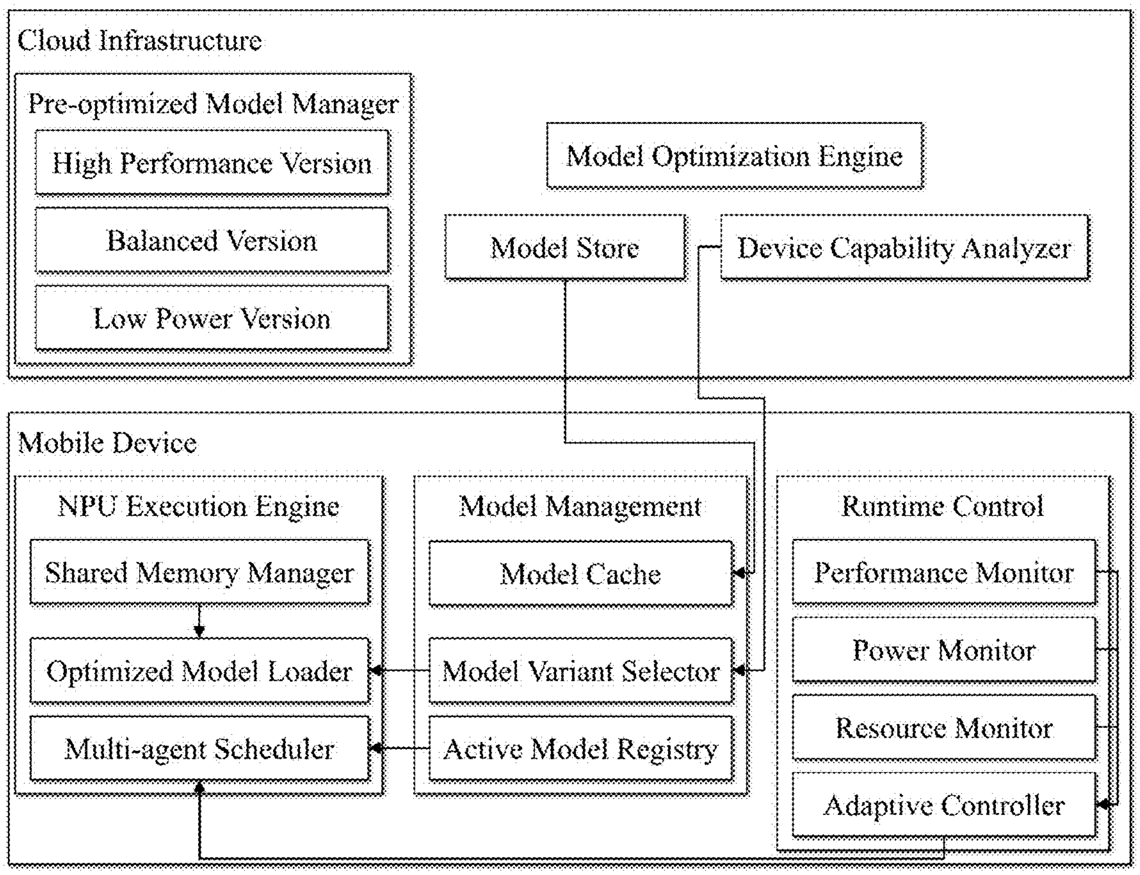
FIG. 24 is a drawing illustrating an example of a pre-optimized model management architecture according to an embodiment of the present invention.
Figure 25:
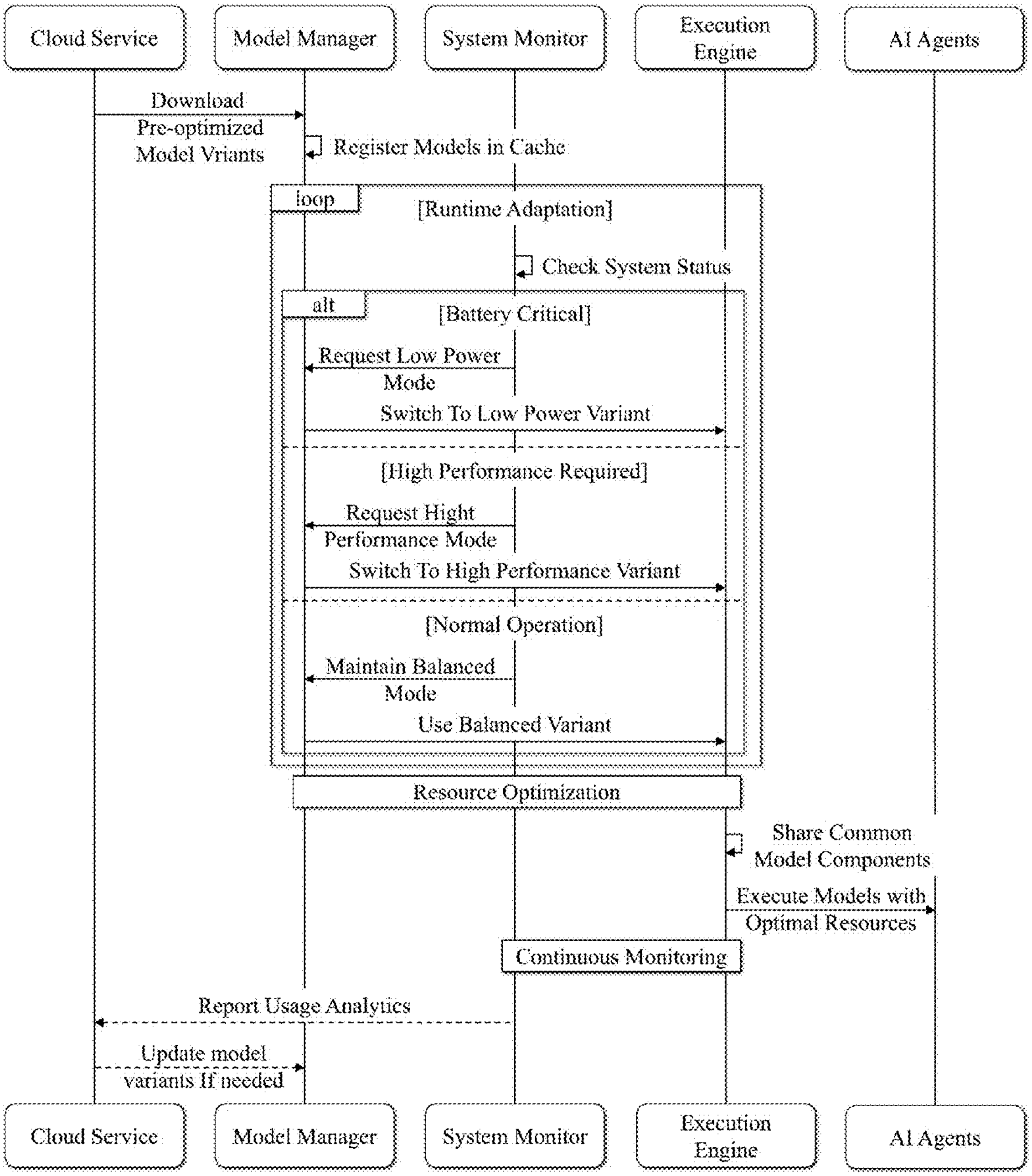
FIG. 25 is a drawing illustrating an example of an adaptive model management sequence according to an embodiment of the present invention.

FIG. 24 is a drawing illustrating an example of a pre-optimized model management architecture according to an embodiment of the present invention, and FIG. 25 is a drawing illustrating an example of an adaptive model management sequence according to an embodiment of the present invention. Due to performance constraints of a terminal, an optimized AI model operating environment may not be supported. To address this issue, AI models may be optimized on Cloud Side, while the terminal may load and utilize models suited to its hardware performance. By utilizing pre-optimized models, terminal battery usage may be optimized, and operational performance may be maximized.

Pre-optimized model management may provide device-specific optimized variants. Models optimized based on hardware characteristics may be provided, and multiple variants may be supported depending on performance and power consumption. In addition, model structures considering storage efficiency may be applied. Through smart caching strategies, frequently used models may be prioritized for cashing and optimized by utilizing memory layer structure. Applying a model component sharing mechanism may further improve memory utilization efficiency.

Adaptive execution management may include functions for selecting models according to the situation. Variant models may be chosen based on battery status, optimized according to performance requirements, and execution may be adjusted by considering system load. To efficiently utilize resources, common model components may be shared, memory pooling may be applied to increase memory utilization, and execution contexts may be reused.

Execution optimization strategies may involve optimization of memory and scheduling. Memory may be shared across models, page alignment may be optimized, and cache-friendly memory layouts may be applied. Scheduling optimization may allow adjustment of execution order based on priority, minimization of resource contention, and support for cooperative execution across agents.

Power management optimization may include dynamic performance adjustment and energy-efficient execution. Modes may be switched depending on battery state, performance may be adjusted based on workload, and NPU clock speed may be optimized. In addition, idle states may be minimized, power consumption monitored, and battery life optimized.

The main advantages of this approach are as follows.

First, resource efficiency may be improved. No additional optimization is required on the terminal, pre-optimized models may be directly utilized, and system load may be minimized.

Second, performance stability may be ensured. Verified model variants may provide predictable performance and allow stable resource usage.

Third, battery efficiency may be enhanced. By selecting the most suitable model for the situation, unnecessary computations may be minimized and power consumption optimized.

Figure 26:
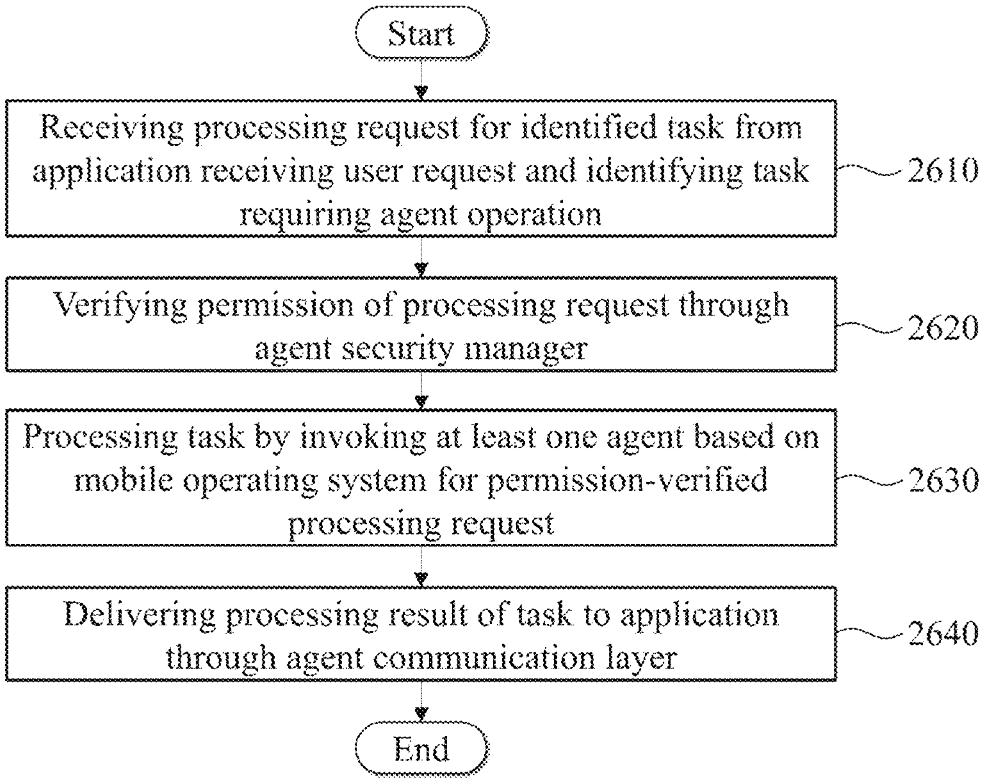
FIG. 26 is a flow chart illustrating an example of an operating method of an AI (Artificial Intelligence) agent system according to an embodiment of the present invention.

FIG. 26 is a flow chart illustrating an example of an operating method of an AI (Artificial Intelligence) agent system according to an embodiment of the present invention. Steps 2610 to 2640 included in the operation method of FIG. 26 may be implemented through the artificial intelligence agent system (the PLAIF 300) described above. The artificial intelligence agent system may be implemented by at least one computer device. Here, the computer device may correspond to the computer device 200 described with reference to FIG. 2. For example, the processor 220 of the computer device 200 may be implemented to execute control instructions according to code of an operating system or code of at least one computer program included in the memory 210. In this case, the processor 220 may control the artificial intelligence agent system such that the artificial intelligence agent system performs Steps 2610 to 2640 included in the method of FIG. 26 according to the control instructions provided by the code stored in the computer device 200.

In Step 2610, the agent communication layer of the artificial intelligence agent system may receive a processing request for an identified task, from an application that has received a user request and identified a task requiring agent operation. In this case, the agent communication layer may receive the application's processing request through an agent development tool. Here, the agent development tool may be implemented to normalize the processing request received from the application into a standardized format, attach required security tokens and authentication information to the processing request, and collect context information required for execution of the task and add it to the processing request.

At this time, the agent communication layer may manage routing of the processing request. For example, the agent communication layer may analyze the destination of the processing request, check the system load state to determine the optimal processing path, determine whether to process the request immediately or place it in a queue according to priority, and monitor the processing status of the task to manage timeouts of the task. In addition, the agent communication layer may transform the data included in the processing request. For example, the agent communication layer may verify or convert the format of the data included in the processing request, process chunk-based segmentation of data according to the data size, apply compression and encryption to the data based on the data importance, and verify integrity of the converted data. The agent communication layer may also manage data synchronization between at least one agent. For example, the agent communication layer may manage the data synchronization status among a plurality of agents processing the same task, detect and resolve data version conflicts, identify data requiring real-time synchronization and prioritize its processing, and execute multiple procedures in the event of synchronization failure. Furthermore, the agent communication layer may manage the priorities of pending tasks. For example, the agent communication layer may adjust processing speed of the task according to system load, perform timeout processing of the task depending on waiting time, monitor queue status, and manage overload conditions.

In Step 2620, the agent runtime environment of the artificial intelligence agent system may verify permission of the processing request through an agent security manager. Here, the agent security manager may manage the permission of the task and the permission of at least one agent, track and record changes in permission, and block and report unauthorized access attempts. The agent security manager may also be implemented to monitor the security status of the artificial intelligence agent system in real time, detect and analyze abnormal behaviors and patterns, assess and respond to security threat levels, and generate and manage security event logs. In addition, the agent security manager may manage policy rules using a policy rule engine, detect and resolve conflicts of the policy rules, monitor the results of policy rule application, and manage and deploy updates of the policy rules. The agent security manager may also be implemented to record security-related activities, generate detailed logs for major security events, analyze log data to derive security insights, and generate reports that meet audit requirements.

In Step 2630, the agent runtime environment may process tasks by invoking at least one agent based on a mobile operating system for the permission-verified processing request. Here, the agent runtime environment may manage agent processes for the at least one agent. For example, the agent runtime environment may manage creation and termination of the agent process, set and manage resource allocation for each agent process, coordinate and manage communication between agent processes, and detect and clean up abnormal agent processes. The agent runtime environment may also monitor resources for the agent processes. For example, the agent runtime environment may monitor in real time resource usage of CPU (Central Processing Unit), memory, and storage of the agent process, predict and alert resource shortage conditions based on the monitored resource usage, analyze resource usage efficiency and generate and provide optimization strategies, and generate a report on the current status of resource usage. In addition, the agent runtime environment may manage the context of the at least one agent. For example, the agent runtime environment may collect execution context information for each of the at least one agent, track and record changes in the context, synchronize context information among agents processing the same task, and create and manage restoration points of the context. The agent runtime environment may also manage a cache handler for data related to the processing of tasks by the at least one agent. For example, the agent runtime environment may store the data in cache based on frequency of data usage, periodically verify validity of the data stored in the cache, and monitor cache hit rate to optimize the cache hit rate.

In Step 2640, the agent runtime environment may deliver the processing result of the task to the application through the agent communication layer.

The advantages of the artificial intelligence agent system (the PLAIF 300) according to embodiments of the present invention are as follows.

Improved system integration: By providing the agent runtime environment at the mobile OS kernel level for OS-level integration, high performance and stability may be ensured. Direct access to system resources allows optimized resource management, while kernel-level security policies enable the establishment of a robust security framework. Furthermore, the system may provide a flexible architecture that supports multiple types of agents simultaneously, considering general extensibility. A modular architecture may allow easy addition of new functions and services, while standardized interfaces may support integration with various applications. In addition, for performance optimization, overhead from system-level integration is minimized, and resources may be efficiently managed and optimized. Real-time performance monitoring and automatic adjustment may also enable more stable performance maintenance.

Enhanced security framework: By considering a multi-layered security structure, consistent security policies may be applied from the kernel level to the application level, and real-time security threat detection and response systems may be established. Fine-grained permission management and access control may further enhance security. For data protection, sensitive data may be encrypted, and secure storage may be provided. End-to-end encryption may be supported during data transmission, and data anonymization may be applied for privacy protection. Also, security-related activities may be thoroughly logged through audit and monitoring systems. Real-time security status may be monitored, alert mechanisms may be established, and security may be enhanced by providing automated responses for security events.

Optimized resource management: Dynamic resource allocation may be required to optimize resource management. Resources may be automatically adjusted according to agent execution states, intelligently distributed depending on system load, and idle resources may be efficiently reused. Also, for cache optimization, frequently used data may be prioritized for caching, and predictive algorithms may be applied to improve cache hit rates. In addition, cache management policies for optimizing memory usage may be implemented. Power consumption of agent operations may be optimized to improve battery efficiency. Performance may be dynamically adjusted depending on battery status, and efficient operation may be supported in low-power modes.

Improved user experience: To improve responsiveness, the system may be optimized to respond immediately to user requests and handle background tasks efficiently, thereby enhancing app responsiveness. Overall user experience may be improved by providing an optimized processing structure minimizing system latency. Additionally, to enhance reliability, high stability may be ensured through system-level integration. Automatic recovery mechanisms for error conditions may be applied, and continuous monitoring, may proactively address potential issues. Furthermore, to provide consistent user experience, agent behavior may be maintained uniformly across all apps. An integrated user interface may be provided system-wide, and adaptive user experiences according to the situation may be supported.

Improved development productivity: To provide a standardized development environment, consistent APIs and development tools may be provided, reusable component libraries may be supported, and clear development guidelines and documentation may be provided. Integrated debugging tools and environments may be provided to support debugging and testing, automated test frameworks may be supported, and detailed logging and monitoring functions may be provided. In addition, to make maintenance easier, a modular structure may be adopted to facilitate maintenance. Clear version management and update mechanisms may be provided, and a structure capable of responding quickly in case of problems may be established.

The aforementioned system and device may be implemented as a hardware component, a software component, and/or a combination of a hardware component and a software component. For example, the device and component described in the embodiments may be implemented using one or more general-purpose computers or special-purpose computers, such as a processor, a controller, an arithmetic logic unit (ALU), a digital signal processor, a microcomputer, a field programmable gate array (FPGA), a programmable logic unit (PLU), a microprocessor, or any other device capable of executing or responding to an instruction. The processing device may perform an operating system (OS) and one or more software applications that are executed on the OS. Furthermore, the processing device may access, store, manipulate, process, and generate data in response to the execution of software. For convenience of understanding, one processing device has been illustrated as being used, but a person having ordinary knowledge in the art may understand that the processing device may include a plurality of processing elements and/or a plurality of types of processing elements. For example, the processing device may include a plurality of processors or one processor and one controller. Furthermore, another processing configuration, such as a parallel processor, is also possible.

Software may include a computer program, a code, an instruction or a combination of one or more of them, and may configure a processing device so that the processing device operates as desired or may instruct the processing devices independently or collectively. The software and/or the data may be embodied in any type of machine, a component, a physical device, virtual equipment, or a computer storage medium or device in order to be interpreted by the processing device or to provide an instruction or data to the processing device. The software may be distributed to computer systems that are connected over a network, and may be stored or executed in a distributed manner. The software and the data may be stored in one or more computer-readable recording media.

The method according to an embodiment may be implemented in the form of a program instruction executable by various computer means and stored in a computer-readable medium. The computer-readable recording medium may include a program instruction, a data file, and a data structure solely or in combination. The medium may continue to store a program executable by a computer or may temporarily store the program for execution or download. Furthermore, the medium may be various recording means or storage means of a form in which one or a plurality of pieces of hardware has been combined. The medium is not limited to a medium directly connected to a computer system, but may be one distributed over a network. Examples of the medium may be magnetic media such as a hard disk, a floppy disk and a magnetic tape, optical media such as a CD-ROM and a DVD, magneto-optical media such as a floptical disk, and media configured to store program instructions, including, a ROM, a RAM, and a flash memory. Furthermore, other examples of the medium may include an app store in which apps are distributed, a site in which various pieces of other software are supplied or distributed, and recording media and/or storage media managed in a server. Examples of program instructions include both machine code, such as produced by a compiler, and higher level code that may be executed by the computer using an interpreter.

As described above, although the embodiments have been described in connection with the limited embodiments and the drawings, those skilled in the art may modify and change the embodiments in various ways from the description. For example, proper results may be achieved although the aforementioned descriptions are performed in order different from that of the described method and/or the aforementioned components, such as a system, a structure, a device, and a circuit, are coupled or combined in a form different from that of the described method or replaced or substituted with other components or equivalents thereof.

Accordingly, other implementations, other embodiments, and the equivalents of the claims fall within the scope of the claims.

What is claimed is:

1. An operating method of an artificial intelligence agent system, wherein the artificial intelligence agent system comprises an agent runtime environment, an agent communication layer, and an agent security manager, wherein the operating method comprises:

receiving a processing request for an identified task from an application that receives a user request and identifies a task requiring agent operation, at the agent communication layer, the processing request being received from the application via an agent development tool, and the agent development tool normalizing the processing request into a standardized format, attaching a security token and authentication information required for the processing request to the processing request, collecting context information required for execution of the task, and packaging the normalized processing request, the security token, the authentication information, and the context information into a message format to pass to the agent communication layer;

verifying permission for the processing request via the agent security manager, at the agent runtime environment;

processing the task by invoking at least one agent based on a mobile operating system for the processing request for which the permission has been verified, at the agent runtime environment, the at least one agent being invoked as a process executing within the mobile operating system by executing a system call to a kernel module of the mobile operating system; and transmitting a result of the task processing to the application via the agent communication layer, at the agent runtime environment, wherein the processing the task comprises:

dynamically setting a resource allocation limit comprising CPU and memory usage for the invoked at least one agent based on a real-time system load and a battery state of the mobile operating system;

monitoring an execution status of the invoked at least one agent against the resource allocation limit; and detecting and cleaning up the invoked at least one agent as an abnormal agent process in response to the invoked at least one agent exceeding the resource allocation limit.

2. The operating method of claim 1, wherein the receiving a processing request comprises:

managing routing of the processing request;

converting data included in the processing request;

managing data synchronization among the at least one agent; and managing priorities of tasks awaiting processing.

3. The operating method of claim 2, wherein the managing routing of the processing request is configured to analyze destination of the processing request, check system load status to determine an optimal processing path, determine whether to process the processing request immediately or place it in a queue based on priority, and monitor the processing status of the task to manage timeout of the task.

4. The operating method of claim 2, wherein the converting data included in the processing request is configured to verify or convert the format of the data included in the processing request, process chunk-based segmentation of the data according to the data size, apply compression and encryption to the data based on the data importance, and verify integrity of the converted data.

5. The operating method of claim 2, wherein the managing data synchronization is configured to manage data synchronization status among a plurality of agents processing the same task, detect and resolve data version conflicts, identify data requiring real-time synchronization and prioritize its processing, and execute multiple procedures in the event of synchronization failure.

6. The operating method of claim 2, wherein the managing priorities is configured to adjust processing speed of the task according to system load, perform timeout processing of the task based on waiting time, monitor queue status, and manage overload conditions.

7. The operating method of claim 1, wherein the processing the task further comprises:

monitoring resources for the invoked at least one agent;

managing context of the at least one agent; and managing a cache handler for data related to the task processing of the at least one agent.

8. The operating method of claim 7, wherein the monitoring resources is configured to monitor in real time resource usage of CPU (Central Processing Unit), memory, and storage of the invoked at least one agent, predict and alert resource shortage conditions based on the monitored resource usage, analyze resource usage efficiency and generate and provide optimization strategies, and generate a report on the current status of resource usage.

9. The operating method of claim 7, wherein the managing context is configured to collect execution context information for each of the at least one agent, track and record changes in the context, synchronize context information among agents processing the same task, and create and manage restoration points of the context.

10. The operating method of claim 7, wherein the managing a cache handler is configured to store the data in cache based on frequency of data usage, periodically verify validity of the data stored in the cache, and monitor cache hit rate to optimize the cache hit rate.

11. The operating method of claim 7, wherein the agent security manager is configured to:

manage permission of the task and permission of the at least one agent, track and record changes in permission, block and report unauthorized access attempts, monitor in real time security status of the artificial intelligence agent system, detect and analyze abnormal behaviors and patterns, assess and respond to security threat levels, generate and manage security event logs, manage policy rules by using a policy rule engine, detect and resolve conflicts of the policy rules, monitor the results of policy rule application, manage and deploy updates of the policy rules, record security-related activities, generate detailed logs for major security events, analyze log data to derive security insights, and generate reports that meet audit requirements.

12. A non-transitory computer-readable storage medium having recorded thereon a computer program for executing an operating method of an artificial intelligence system on a computer device, wherein the artificial intelligence agent system comprises an agent runtime environment, an agent communication layer, and an agent security manager, and wherein the operating method comprises:

receiving a processing request for an identified task from an application that receives a user request and identifies a task requiring agent operation, at the agent communication layer, the processing request being received from the application via an agent development tool, and the agent development tool normalizing the processing request into a standardized format, attaching a security token and authentication information required for the processing request to the processing request, collecting context information required for execution of the task, and packaging the normalized processing request, the security token, the authentication information, and the context information into a message format to pass to the agent communication layer;

verifying permission for the processing request via the agent security manager, at the agent runtime environment;

processing the task by invoking at least one agent based on a mobile operating system for the processing request for which the permission has been verified, at the agent runtime environment, the at least one agent being invoked as a process executing within the mobile operating system by executing a system call to a kernel module of the mobile operating system; and transmitting a result of the task processing to the application via the agent communication layer, at the agent runtime environment, wherein the processing the task comprises:

dynamically setting a resource allocation limit comprising CPU and memory usage for the invoked at least one agent based on a real-time system load and a battery state of the mobile operating system;

monitoring an execution status of the invoked at least one agent against the resource allocation limit; and detecting and cleaning up the invoked at least one agent as an abnormal agent process in response to the invoked at least one agent exceeding the resource allocation limit.

13. An artificial intelligence agent system, comprising:

at least one processor; and a memory coupled to the at least one processor, the memory storing instructions that, when executed by the at least one processor, cause the artificial intelligence agent system to implement:

an agent communication layer for receiving a processing request for an identified task from an application that receives a user request and identifies a task requiring agent operation, the processing request being received from the application via an agent development tool, and the agent development tool normalizing the processing request into a standardized format, attaching a security token and authentication information required for the processing request to the processing request, collecting context information required for execution of the task, and packaging the normalized processing request, the security token, the authentication information, and the context information into a message format to pass to the agent communication layer;

an agent runtime environment for verifying permission for the processing request via an agent security manager, processing the task by invoking at least one agent based on a mobile operating system for the processing request for which the permission has been verified, the at least one agent being invoked as a process executing within the mobile operating system by executing a system call to a kernel module of the mobile operating system, and transmitting a result of the task processing to the application via the agent communication layer, and the agent security manager for managing permission of the task and permission of the at least one agent, wherein the processing the task by the agent runtime environment comprises:

dynamically setting a resource allocation limit comprising CPU and memory usage for the invoked at least one agent based on a real-time system load and a battery state of the mobile operating system;

monitoring an execution status of the invoked at least one agent against the resource allocation limit; and detecting and cleaning up the invoked at least one agent as an abnormal agent process in response to the invoked at least one agent exceeding the resource allocation limit.

14. The artificial intelligence agent system of claim 13, wherein the agent communication layer is configured to:

manage routing of the processing request;

convert data included in the processing request;

manage data synchronization among the at least one agent; and manage priorities of tasks awaiting processing.

15. The artificial intelligence agent system of claim 13, wherein the agent runtime environment is further configured to:

monitor resources for the invoked at least one agent;

manage context of the at least one agent; and manage a cache handler for data related to the task processing of the at least one agent.

16. The artificial intelligence agent system of claim 13, wherein the agent security manager is configured to:

manage permission of the task and permission of the at least one agent, track and record changes in permission, block and report unauthorized access attempts, monitor in real time security status of the artificial intelligence agent system, detect and analyze abnormal behaviors and patterns, assess and respond to security threat levels, generate and manage security event logs, manage policy rules by using a policy rule engine, detect and resolve conflicts of the policy rules, monitor the results of policy rule application, manage and deploy updates of the policy rules, record security-related activities, generate detailed logs for major security events, analyze log data to derive security insights, and generate reports that meet audit requirements.

* * * * *